(12) United States Patent
Davis et al.

(10) Patent No.: US 12,130,644 B2
(45) Date of Patent: Oct. 29, 2024

(54) ROLL-BIASED SKID-TO-TURN TERMINAL GUIDANCE WITH RUDDER INTEGRATOR FEEDBACK

(71) Applicant: AEROVIRONMENT, INC., Arlington, VA (US)

(72) Inventors: Scott David Davis, West Hills, CA (US); Drew David Mitchner, Chatsworth, CA (US)

(73) Assignee: AEROVIRONMENT, INC., Arlington, VA (US)

( * ) Notice: Subject to any disclaimer, the term of this patent is extended or adjusted under 35 U.S.C. 154(b) by 0 days.

(21) Appl. No.: 18/564,534

(22) PCT Filed: May 27, 2022

(86) PCT No.: PCT/US2022/031294
§ 371 (c)(1),
(2) Date: Nov. 27, 2023

(87) PCT Pub. No.: WO2022/251598
PCT Pub. Date: Dec. 1, 2022

(65) Prior Publication Data
US 2024/0264607 A1  Aug. 8, 2024

Related U.S. Application Data

(60) Provisional application No. 63/314,597, filed on Feb. 28, 2022, provisional application No. 63/194,762, filed on May 28, 2021.

(51) Int. Cl.
*G05D 1/48* (2024.01)
*G05D 1/49* (2024.01)
(Continued)

(52) U.S. Cl.
CPC ............... *G05D 1/484* (2024.01); *G05D 1/49* (2024.01); *G05D 2109/20* (2024.01); *G05D 2111/10* (2024.01)

(58) Field of Classification Search
None
See application file for complete search history.

(56) References Cited

U.S. PATENT DOCUMENTS

2004/0155142 A1\* 8/2004 Muravez ................. F41G 7/301
                                                                  244/3.1
2014/0172200 A1\* 6/2014 Miralles ................ B64C 39/024
                                                                  701/3

(Continued)

OTHER PUBLICATIONS

Bai et al., "Hybrid BTT/STT missile autopilot design", 2017, Aircraft Engineering and Aerospace Technology, vol. 89, Issue 6, pp. 809-814 (Year: 2017).\*

(Continued)

*Primary Examiner* — Tamara L Weber
(74) *Attorney, Agent, or Firm* — Concept IP LLP; Michael Zarrabian; Eric Aagaard

(57) ABSTRACT

Systems, devices, and methods for an aircraft autopilot guidance control system for guiding an aircraft having a body, the system comprising: a processor configured to determine if a yaw angle difference and a pitch angle difference meet corresponding angle thresholds; a skid-to-turn module configured to generate a skid-to-turn signal if the corresponding angle thresholds are met; a bank-to-turn module configured to generate a bank-to-turn signal having a lower bandwidth than the generated skid-to-turn signal; a rudder integrator module configured to add a rudder integrator feedback signal to the bank-to-turn signal, where the rudder integrator feedback signal is proportional to a rudder integrator; and a filter module configured to filter the generated bank-to-turn signal, wherein the filter module com- (Continued)

prises a low-pass filter configured by a set of gains to pass the bank-to-turn signal if a side force on the body meets a side force threshold.

19 Claims, 20 Drawing Sheets

(51) Int. Cl.
  *G05D 109/20* (2024.01)
  *G05D 111/10* (2024.01)

(56) References Cited

U.S. PATENT DOCUMENTS

| | | |
|---|---|---|
| 2014/0324253 A1 | 10/2014 | Duggan et al. |
| 2015/0060593 A1 | 3/2015 | Prince et al. |
| 2016/0231753 A1 | 8/2016 | Wise et al. |
| 2017/0108868 A1 | 4/2017 | Johnson et al. |
| 2020/0039636 A1 | 2/2020 | Miralles |

OTHER PUBLICATIONS

Huang et al., "Method for improving the bank-to-turn missile manoeuvrability", 2017, The Institution of Engineering and Technology (IET) Control Theory & Applications, vol. 11, Issue 4, pp. 586-592 (Year: 2017).*

Beard. Embedded UAS Autopilot and Sensor Systems. Feb. 17, 2010. (Feb. 17, 2010). [retrieved on Mar. 8, 2022]. Retrieved from Internet: pp. 1-27.

International Search Report and Written Opinion for PCT/US2022/031294, mailed Sep. 1, 2022.

* cited by examiner

Table 1. UAV Reference Dimensions

| Parameter | Name | Value |
|---|---|---|
| Mass (lbm) | mass | 33.105 |
| Reference Area (in²) | S_ref_in2 | 701.6623 |
| Reference Chord (in) | c_ref_in | 10.1250 |
| Reference Span (in) | b_ref_in | 69.3000 |
| Reference Center Of Gravity (in, from nose) | x_moment_ref_in | -32.8500 |

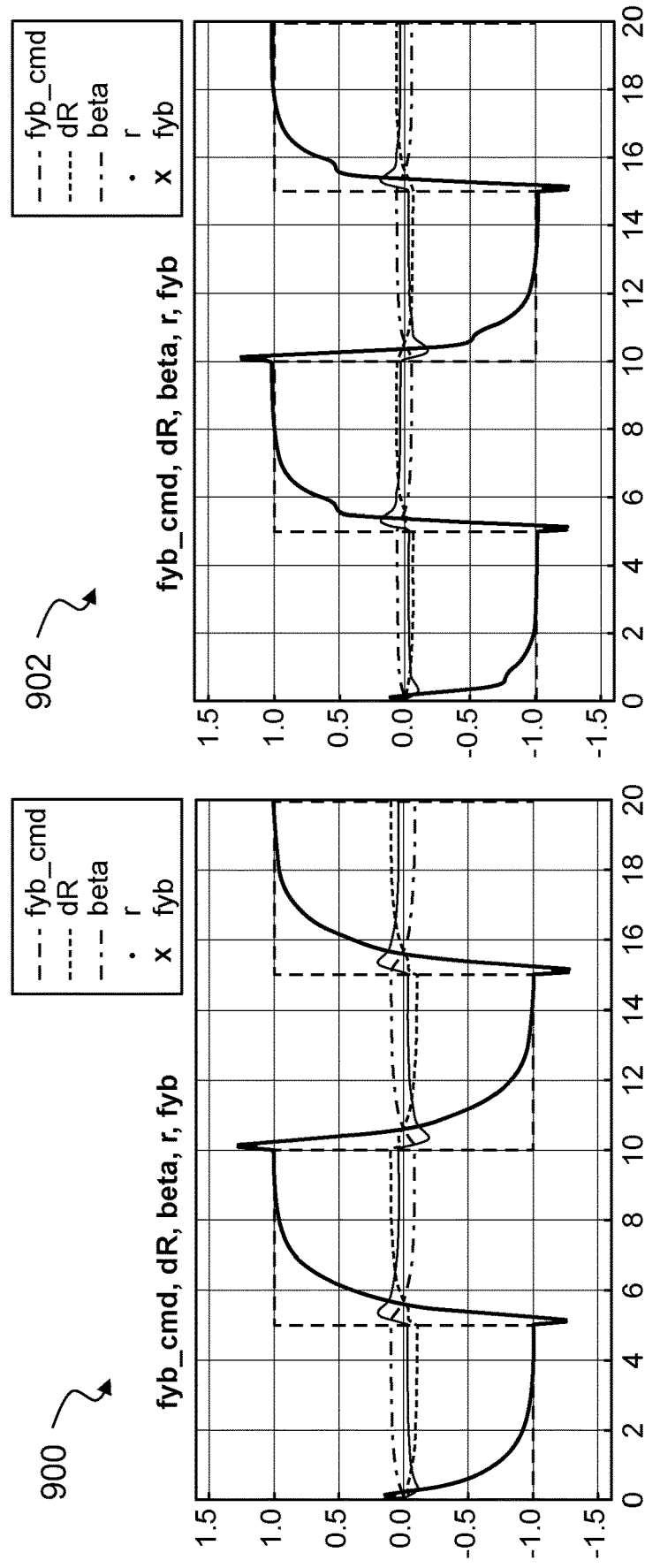

Table 2. Time domain response to lateral acceleration step input

| Control Architecture | Rise Time (s) | Settling Time (s) |
|---|---|---|
| Base Skid-To-Turn | 2.137 | 3.030 |
| Roll-Biased Skid-To-Turn With Rudder Integrator Feedback | 1.710 | 2.159 |

FIG. 10A

Table 3. Circle Error Probable Results, 50% and 90% Radii

| Control Architecture | Stationary Target | | Moving Target | |
|---|---|---|---|---|
| | CEP | P90 | CEP | P90 |
| Bank-To-Turn | 0.188 | 0.681 | 0.272 | 1.065 |
| Skid-To-Turn | 0.159 | 0.711 | 0.259 | 1.271 |
| Roll-Biased Skid-To-Turn With Rudder Integral Feedback | 0.115 | 0.315 | 0.236 | 0.656 |

FIG. 10B

ROLL-BIASED SKID-TO-TURN TERMINAL GUIDANCE WITH RUDDER INTEGRATOR FEEDBACK

CROSS-REFERENCE TO RELATED APPLICATION

This application is a 35 U.S.C. § 371 National Stage Entry of International Application No. PCT/US2022/031294, filed May 27, 2022, which claims the priority benefit of U.S. Provisional Patent Application Ser. No. 63/194,762 filed May 28, 2021, and claims the priority benefit of U.S. Provisional Patent Application Ser. No. 63/314,597 filed Feb. 28, 2022, all of which are incorporated herein by reference in their entireties.

FIELD OF ENDEAVOR

The invention relates to autopilot control systems, and more particularly to autopilot control systems for terminally guided munitions.

BACKGROUND

One type of aircraft autopilot guidance includes a control system that allows aircraft to make a series of maneuvers and turns to approach and engage a target. The control system operates on the control surfaces of an aircraft, such as ailerons, elevators, and rudders, to guide the aircraft in desired directions

SUMMARY

An aircraft autopilot guidance control system may include: a processor having addressable memory, the processor configured to: calculate a body to target line of sight angle and a line of sight rate; determine if a yaw angle difference and a pitch angle difference meet corresponding angle thresholds; generate a skid-to-turn signal if the corresponding angle thresholds are met; generate a bank-to-turn signal having a lower bandwidth than the skid-to-turn signal if the corresponding angle thresholds are met; add a rudder integrator feedback proportional to a rudder integrator used in the skid-to-turn signal to the bank-to-turn signal; and filter the bank-to-turn signal using a low-pass filter that has been configured by a set of gains to pass the bank-to-turn signal if the body's side force meets a side force threshold.

An embodiment for an aircraft autopilot guidance control system for guiding an aircraft having a body may include: a processor configured to determine if a yaw angle difference and a pitch angle difference meet corresponding angle thresholds; a skid-to-turn module configured to generate a skid-to-turn signal if the corresponding angle thresholds are met; a bank-to-turn module configured to generate a bank-to-turn signal having a lower bandwidth than the generated skid-to-turn signal; a rudder integrator module configured to add a rudder integrator feedback signal to the bank-to-turn signal, where the rudder integrator feedback signal may be proportional to a rudder integrator; and a filter module configured to filter the generated bank-to-turn signal, where the filter module comprises a low-pass filter configured by a set of gains to pass the bank-to-turn signal if a side force on the body meets a side force threshold.

In additional system embodiments, the processor may be further configured to: receive a body to target line of sight signal, receive a line of sight rate signal, and determine the yaw angle difference and the pitch angle difference based on the body to target line of sight signal and the line of sight rate signal. In additional system embodiments, the skid-to-turn module further comprises a loop for implementing the skid-to-turn signal; the rudder integrator module further comprises a rudder integrator feedback gain configured to receive an output from the loop for implementing the skid-to-turn signal; and the bank-to-turn module further comprises a loop for implementing the bank-to-turn signal configured to receive an output from the rudder integrator feedback gain.

In additional system embodiments, the loop for implementing the skid-to-turn signal further comprises: a body side specific force command module; a skid-to-turn steady state gain configured to receive a signal from the body side specific force command module; a skid-to-turn acceleration error summing junction configured to receive a signal from the skid-to-turn steady state gain; a skid-to-turn acceleration error gain configured to receive a signal from the skid-to-turn acceleration error summing junction; a skid-to-turn rate error command summing junction configured to receive a signal from the skid-to-turn acceleration error gain; a skid-to-turn rate error integrator gain configured to receive a signal from the skid-to-turn rate error command summing junction; a rudder integrator module configured to receive a signal from the skid-to-turn rate error integrator gain; a skid-to-turn rate error summing block configured to receive a signal from the rudder integrator module; a skid-to-turn rudder command control gain configured to receive a signal from the skid-to-turn rate error summing block; and a skid-to-turn rudder command dynamic pressure scaling gain configured to receive a signal from the skid-to-turn rudder command control gain.

In additional system embodiments, the rudder integrator feedback gain may be configured to receive the signal from the rudder integrator module, and where the rudder integrator feedback gain may be configured to generate a rudder integrator signal. In additional system embodiments, the loop for implementing the bank-to-turn signal further comprises: a roll angle command module; an augmented bank-to-turn signal generated based on a signal from the roll angle command module and the generated rudder integrator signal; a main filter module configured to receive the augmented bank-to-turn signal; a roll angle error summing junction configured to receive a signal from the main filter module; a roll angle error proportional gain configured to receive a signal from the roll angle error summing junction; a roll rate command proportional and integral summing junction configured to receive a signal from the roll angle error proportional gain; a roll angle error integral gain configured to receive a signal from the roll angle error summing junction; a roll angle error integrator configured to receive a signal from the roll angle error integral gain; a roll rate error summing junction configured to receive a signal from the roll angle error integrator, a signal from the roll rate command proportional and integral summing junction, and a signal from a roll rate feedback gain; and a roll aileron command dynamic pressure scaling gain configured to receive a signal from the roll rate error summing junction.

In additional system embodiments, the roll angle command module further comprises the low-pass filter. In additional system embodiments, the roll angle command module may be configured to set to a non-zero value for generating the bank-to-turn signal with a lower bandwidth than the skid-to-turn signal generated by the body side specific force command module. In additional system embodiments, the main filter module may be configured to decouple the loop for implementing the bank-to-turn signal and the loop for implementing the skid-to-turn signal. In additional system embodiments, a low-pass filter of the main filter module may be configured to ensure that the bank-to-turn signal has lower bandwidth than the skid-to-turn signal.

In additional system embodiments, the processor may be further configured to: generate one or more actuator commands; and output the one or more actuator commands to vehicle plant dynamics. In additional system embodiments, the vehicle plant dynamics comprise: a skid-to-turn rudder actuator transfer function model configured to receive a signal from the skid-to-turn rudder command dynamic pressure scaling gain; a roll aileron actuator transfer function model configured to receive a signal from the roll aileron command dynamic pressure scaling gain; and a vehicle lateral dynamics state-space model configured to receive a signal from the skid-to-turn rudder actuator transfer function model and a signal from the roll aileron actuator transfer function model.

In additional system embodiments, the system further comprises: one or more optical sensors, where the one or more optical sensors may be configured to generate the body to target line of sight. In additional system embodiments, the system further comprises: one or more differentiators, where the one or more differentiators may be configured to generate the line of sight rate. In additional system embodiments, the generated line of sight rate comprises differentiation of a line-of-sight vector expressed in an inertial frame.

In additional system embodiments, the system further comprises: one or more side force optimizers, where the one or more side force optimizers may be configured to provide the side force threshold to the processor. In additional system embodiments, the side force threshold may be selected through optimization and set prior to a flight.

In additional system embodiments, the system further comprises: one or angle threshold optimizers, where the one or angle threshold optimizers may be configured to provide the angle thresholds to the processor. In additional system embodiments, the angle thresholds may be selected through optimization and set prior to the flight.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 9A illustrates a step response from a typical skid-to-turn guidance system, according to an embodiment of the disclosure;

FIG. 9B illustrates a step response based on roll-biased skid-to-turn guidance, according to an embodiment of the disclosure;

FIG. 10A illustrates a table containing time domain response data;

FIG. 10B illustrates a table containing circle error probable results;

DETAILED DESCRIPTION

Figure 1:
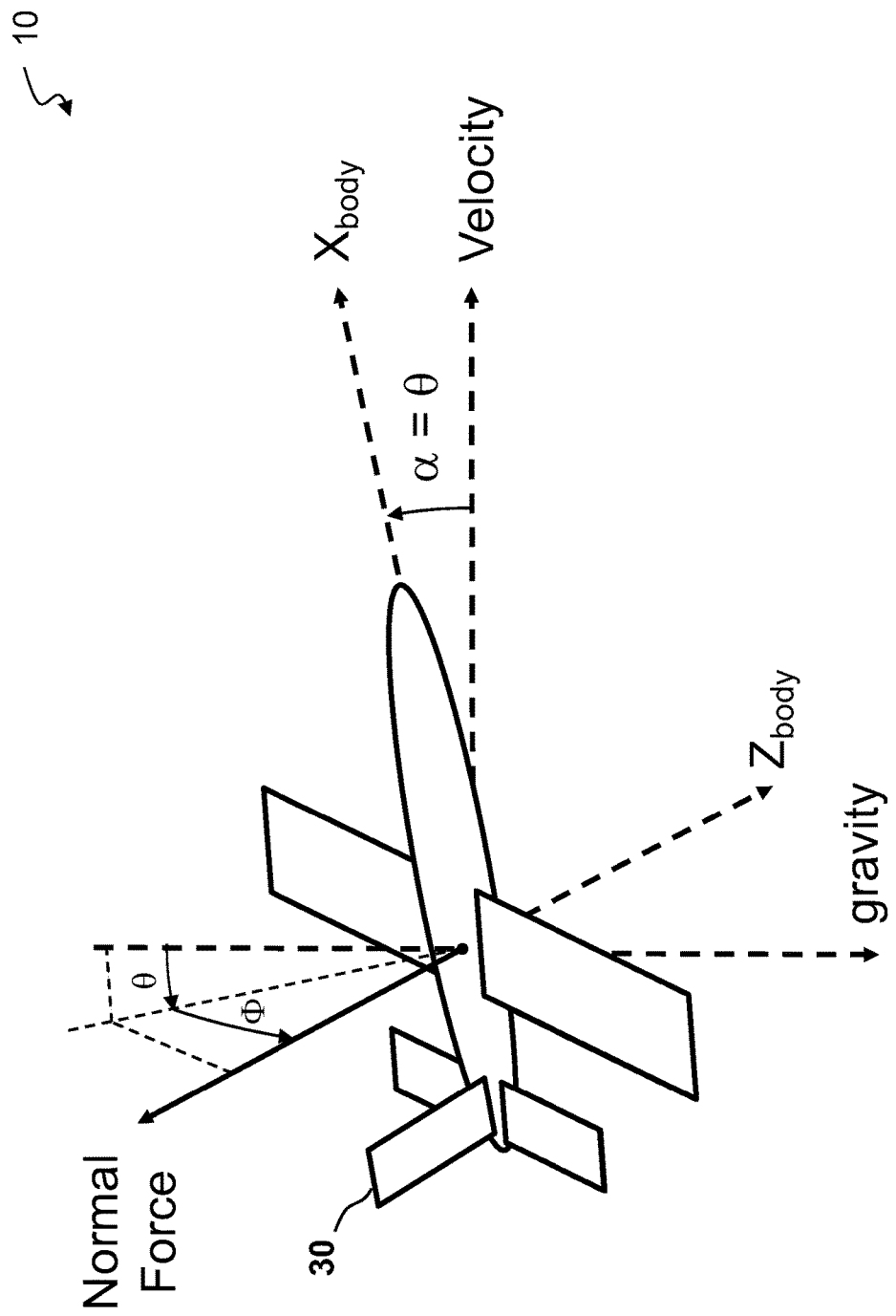
FIG. 1 depicts an illustration of a normal force in the pitch plane acting on an aircraft with control surfaces, such as a missile, according to an embodiment of the disclosure.

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation, including meanings implied from the description as well as meanings understood by those skilled in the art and/or as defined in dictionaries, treatises, etc.

Embodiments of a method and system for aircraft guidance are disclosed herein. One embodiment provides a method and system for aircraft autopilot guidance. In one embodiment, bank-to-turn aircraft guidance control comprises a control system implementing a method of operating the control surfaces of an aircraft such that the aircraft performs a banking turn, whereby the aircraft is rotating on its roll axis to turn. During the banking turn, the aircraft is controlled such that the centripetal force experienced by the aircraft is equal to the horizontal component of normal lift force. This may be accomplished by adjusting the aircraft ailerons to rotate the aircraft to the desired roll angle. Bank-to-turn guidance is, in one example, suitable for turns that require a large side force. Bank-To-Turn (BTT) has the advantage of generating larger side forces than Skid-To-Turn (STT), which may be accomplished by commanding relatively large roll angles (>30 deg). At those angles, a large pitch normal force would be required, but that follows from the large side force required.

An aircraft guidance system implementing a guidance method is disclosed herein for guiding an aircraft to a target. In one embodiment, said guidance comprises calculating aircraft body to target line of sight angles and line of sight rates. The target line of sight angles and line of sight rates are determined using an onboard camera-based target tracker. The camera tracker may always be active if the vehicle is tracking a target. The yaw and pitch angle thresholds may not be relevant to the camera tracker and may only be used to switch ON the roll biased STT algorithm when it is time for a target engagement, in some embodiments.

The parameters used to determine a yaw angle difference and pitch angle difference may be Psi, Psi_tgt, and Psi_threshold_for_arcover. Psi is a yaw angle of the aircraft. Psi_tgt is a yaw angle between the aircraft yaw angle and target line-of-sight angle, i.e., a yaw pointing error or yaw angle difference. Psi_threshold_for_arcover is if an absolute value of psi_tgt is less than this threshold value, then the blended STT/BTT guidance is started.

Theta is a pitch angle of the aircraft. Theta_tgt is a pitch angle between aircraft pitch angle and target line-of-sight pitch angle. Theta_threshold_for_arcover is if theta_tgt is less than (more negative) theta_tgt, then the blended STT/BTT guidance is started.

The selected angle thresholds may be a greater than or less than comparison. If (abs(psi_tgt)<psi_threshold_for_arcover). If (theta_tgt<theta_threshold_for_arcover). Both threshold values may be selected through optimization.

If the selected angle thresholds are met, then a skid-to-turn signal is generated and a bank-to-turn signal is generated having a lower bandwidth than the skid-to-turn signal. After both the bank-to-turn and skid-to-turn signals have been generated, a rudder integrator feedback signal is added to the bank-to-turn signal, wherein the rudder integrator feedback signal is proportional to a rudder integrator.

In one embodiment, the bank-to-turn signal is filtered using a low-pass filter that has been configured by a set of gains to pass the bank-to-turn signal if a side force command meets a side force threshold. The side force threshold activates the BTT segment. For low side force commands that can be handled by STT alone, there isn't a need to engage the BTT by changing the commanded roll angle. If the commanded side force is below the side force threshold, the bank-to-turn signal remains constant. This is a threshold which activates the BTT segment. For low side force commands that can be handled by STT alone, there may not be a need to engage the BTT by changing the commanded roll angle. In some embodiments, the side force threshold may be determined through optimization.

In some embodiments, the low-pass filter may be used to optimize results. Decoupling the BTT and STT signals with the low-pass filter is very important for optimal results. In some embodiments, the disclosed guidance algorithm may work without the filter.

Gains may include Tau_phi_roll_bias, Phi_stt_int, Phi_lim_roll bias, and Phi_cmd_rate_limit. Tau phi_roll_bias is a time constant for the low-pass filter. Tau phi_roll_bias may be the only gain for the low-pass filter. Phi_stt_int is gain multiplied by the rudder integrator to add additional roll bias. Phi lim roll_bias is a max commandable roll angle from BTT. Phi_cmd_rate_limit is a slew rate limit on commanded roll angle from BTT.

A threshold for the side force on the aircraft body meeting the side force threshold may be Fyp_threshold_for_roll_bias. Fyp_threshold_for_roll_bias is a threshold for side force command above which BTT is added to. If (abs (sideforce command)>Fyb_threshold_for_roll_bias).

In one embodiment, skid-to-turn aircraft guidance control comprises a control system implementing a method of operating the control surfaces of an aircraft such that the aircraft performs a skidding turn, whereby the aircraft is rotating on its yaw axis to turn. During the skidding turn, the aircraft is controlled such that the centripetal force experienced by the aircraft is equivalent to the horizontal lift force. This may be accomplished by adjusting the aircraft rudder to rotate the aircraft to the desired yaw angle. Skid-to-turn guidance is, in one example, suitable for turns that require a rapid and precise yaw correction and only small roll corrections.

One aircraft type configuration comprises a large horizontal wing mounted near the aircraft center of gravity and steering to guide the vehicle to its intended target. In this configuration, a large normal force offsetting the total vehicle gravitational force is rotated in roll to generate side force horizontal acceleration towards the target while a vertical tail rudder employs a yaw damper to minimize yaw rates and assists in coordinating turns. This configuration is suited for long range cruise missions and has the added benefit for air breathing combustion engines as bank-to-turn steering minimizes sideslip excursions which could flameout an engine.

At steep terminal target engagements, the normal force required to offset gravity is minimal. To generate side force using bank-to-turn in this condition, the system first requires that a pitch normal force be generated. This may initially perturb the intended vertical track but will eventually provide the desired side force when rolled appropriately. Small side force adjustments may require large roll angle excursions if the current available normal force is also small. This condition compounds in the presence of target tracking noise and may lead to roll angle command singularities.

Employing skid-to-turn side force control decouples the pitch and yaw motions, increases the response speed, and decreases lateral miss distances provided that there is sufficient side force authority. Adding a vertical wing to create a cruciform configuration provides the necessary lateral authority. However, the resultant drag contribution will significantly degrade long range performance.

In one embodiment disclosed herein, aircraft autopilot guidance control comprises skid-to-turn guidance and bank-to-turn guidance, where a skid-to-turn guidance is augmented with bank-to-turn guidance to provide lateral acceleration control. In a preferred embodiment, the system only uses STT. In some embodiments, STT is insufficient when large yaw corrections, e.g., thus, large side forces, are required. Augmenting STT with BTT closes this gap as the advantage of BTT is the large side force capability.

An embodiment of a guidance method disclosed herein comprises calculating aircraft body to target line of sight angles and line of sight rates. The target line of sight angles and line of sight rates are used to determine if the aircraft yaw angle difference and the pitch angle difference meet corresponding selected angle thresholds. If the selected angle thresholds are met, then a skid-to-turn signal is generated and a bank-to-turn signal is generated having a lower bandwidth than the skid-to-turn signal. After both the bank-to-turn and skid-to-turn signals have been generated, a rudder integrator feedback signal is added to the bank-to-turn and skid-to-turn signals, wherein the rudder integrator feedback signal is proportional to a rudder integrator. In one embodiment, the bank-to-turn signal is filtered using a low-pass filter that has been configured by a set of gains to pass the bank-to-turn signal if a side force on aircraft body meets a side force threshold.

One implementation of a system and method disclosed herein provides roll-biased skid-to-turn guidance with rudder integrator feedback. One example control system and method comprises a skid-to-turn three-loop lateral acceleration control autopilot, augmented with bank-to-turn steering proportional to the skid-to-turn three-loop integrator. This blended autopilot maintains the high bandwidth of skid-to-turn while gradually offloading large, persistent side force commands to the bank-to-turn control loop. Optimization of the relevant gains is employed to provide the desired response and reduce miss distances.

Referring to the drawings, example embodiments of the disclosed method and system are further described herein.

FIG. 1 depicts an illustration 10 of a normal force in the pitch plane acting on an aircraft with control surfaces, such as a missile 30. In this case, the missile 30 is flying with the angle of attack, $\alpha$, equal to the pitch angle, $\theta$, bank angle, $\Phi$, and zero side-slip angle. The normal force in the pitch plane is rotated by controlling a bank angle $\Phi$ to guide the missile 30 towards the target.

Figure 2B:
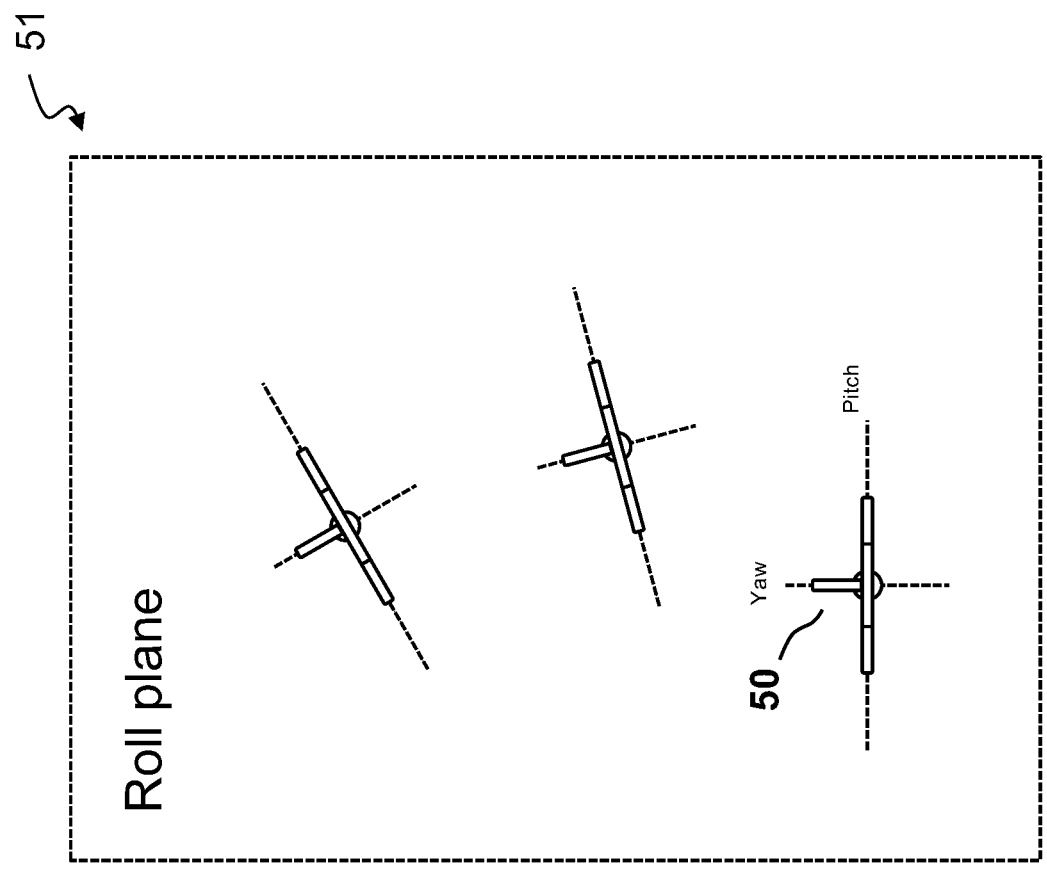
FIG. 2B shows an example missile performing a banking turn, according to an embodiment of the disclosure.
Figure 2A:
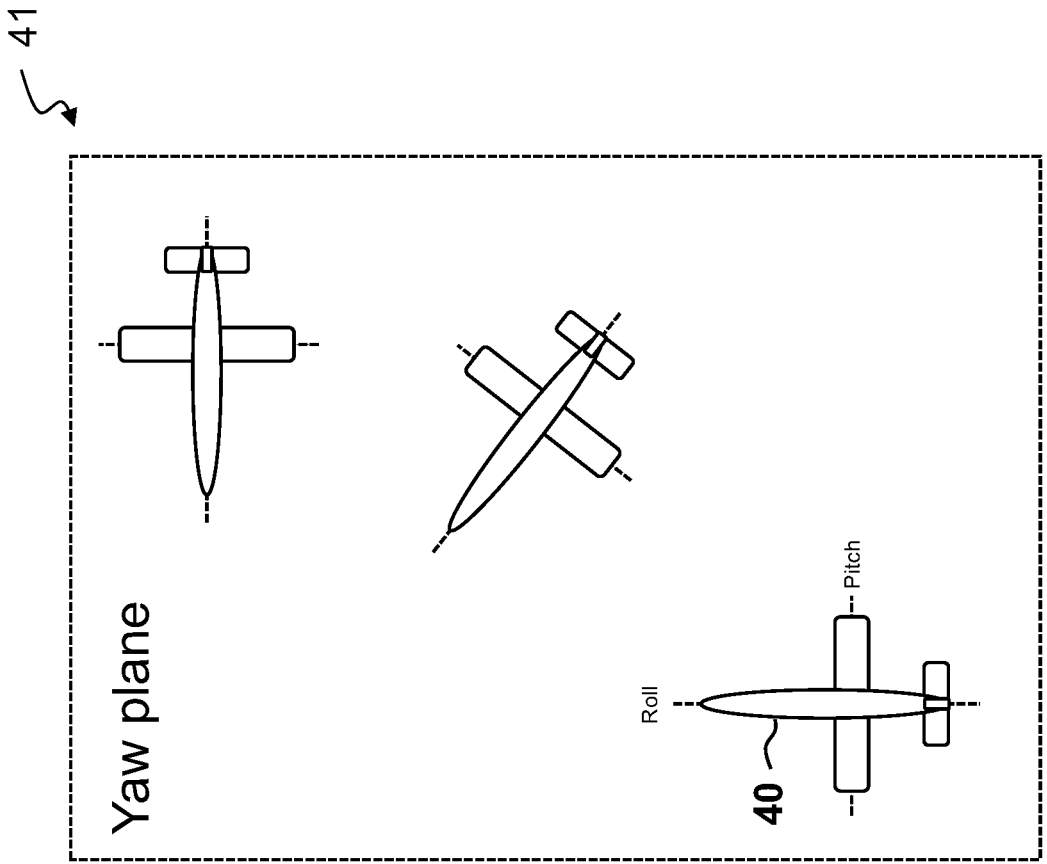
FIG. 2A shows an example missile performing a skidding turn, according to an embodiment of the disclosure.

FIG. 2A shows an example missile 40 performing a skidding turn 41 in a yaw plane. The missile 40 ends the skidding turn with the missile's 40 roll axis rotated about ninety degrees from its original orientation.

FIG. 2B shows an example missile 50 performing a banking turn 51 in a roll plane. The missile 50 ends the banking turn with the missile's 50 yaw axis and pitch axis rotated about thirty degrees from its original orientation.

Figure 3:
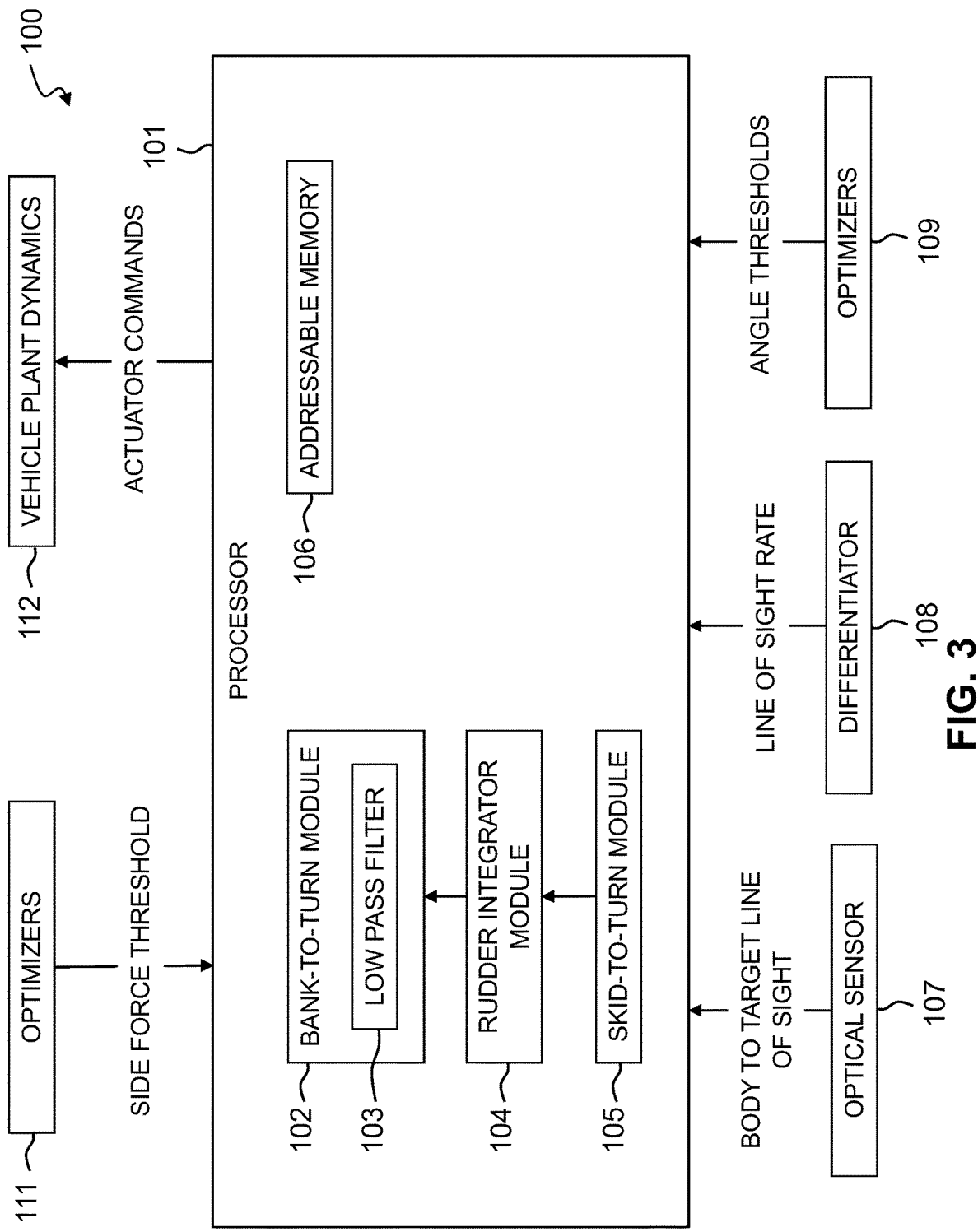
FIG. 3 depicts a high-level block diagram of an embodiment of an aircraft autopilot guidance control system, according to an embodiment of the disclosure.

FIG. 3 depicts a high-level block diagram of an embodiment of an aircraft autopilot guidance control system 100. The aircraft autopilot guidance control system 100 may include a processor 101 having addressable memory 106. The processor 101 may be configured to calculate a body to target line of sight from one or more optical sensors 107 providing one or more optical sensor measurements. The processor 101 may also be configured to calculate a line-of-sight rate from one or more differentiators 108. The one or more differentiators 108 may provide differentiation of a line-of-sight vector expressed in an inertial frame. One or more angle threshold optimizers 109 may provide one or more angle thresholds to the processor 101. The angle thresholds may be selected through optimization and may be set prior to flight. One or more side force optimizers 111 may provide one or more side force thresholds to the processor 101. The side force thresholds may be selected through optimization and set prior to flight. The processor 101 may be further configured to determine if a yaw angle difference and a pitch angle difference meet corresponding angle thresholds provided by the one or more angle threshold optimizers 109. In some embodiments, the one or more angle threshold optimizers 109 may determine the angle thresholds through offline optimization to find the parameters that give the best accuracy results. In some embodiments, once the angle thresholds are determined, the angle thresholds may be set and may not change during flight. The processor 101 may be further configured to generate a skid-to-turn signal via a skid-to-turn module 105 if the corresponding angle thresholds from the one or more optimizers 109 are met. The processor 101 may be further configured to generate a bank-to-turn signal via a bank-to-turn module 102 having a lower bandwidth than the skid-to-turn signal from the skid-to-turn module 105 if the corresponding angle thresholds from the one or more optimizers 109 are met. The processor 101 may be further configured to add a rudder integrator feedback via a rudder integrator module 104 proportional to a rudder integrator used in the skid-to-turn signal from the skid-to-turn module 105 to the bank-to-turn from the bank-to-turn module 102. The processor 101 may be further configured to filter the bank-to-turn signal from the bank-to-turn module 102 using a low-pass filter 103 that has been configured by a set of gains to pass the bank-to-turn signal from the bank-to-turn module 102 if the body's side force meets a side force threshold from the one or more side force optimizers 111. In some embodiments, the one or more angle side force optimizers 111 may determine the side force thresholds through offline optimization to find the parameters that give the best accuracy results. In some embodiments, once the side force thresholds are determined, the side force thresholds may be set and may not change during flight. The processor 101 may be further configured to send actuator commands to a vehicle plant dynamics module 112. The actuator commands and the vehicle plant dynamics 112 module may control actuators, ailerons, elevators, rudders, and the like to control the aircraft and/or missile in a BTT and/or STT maneuver.

Figure 4A:
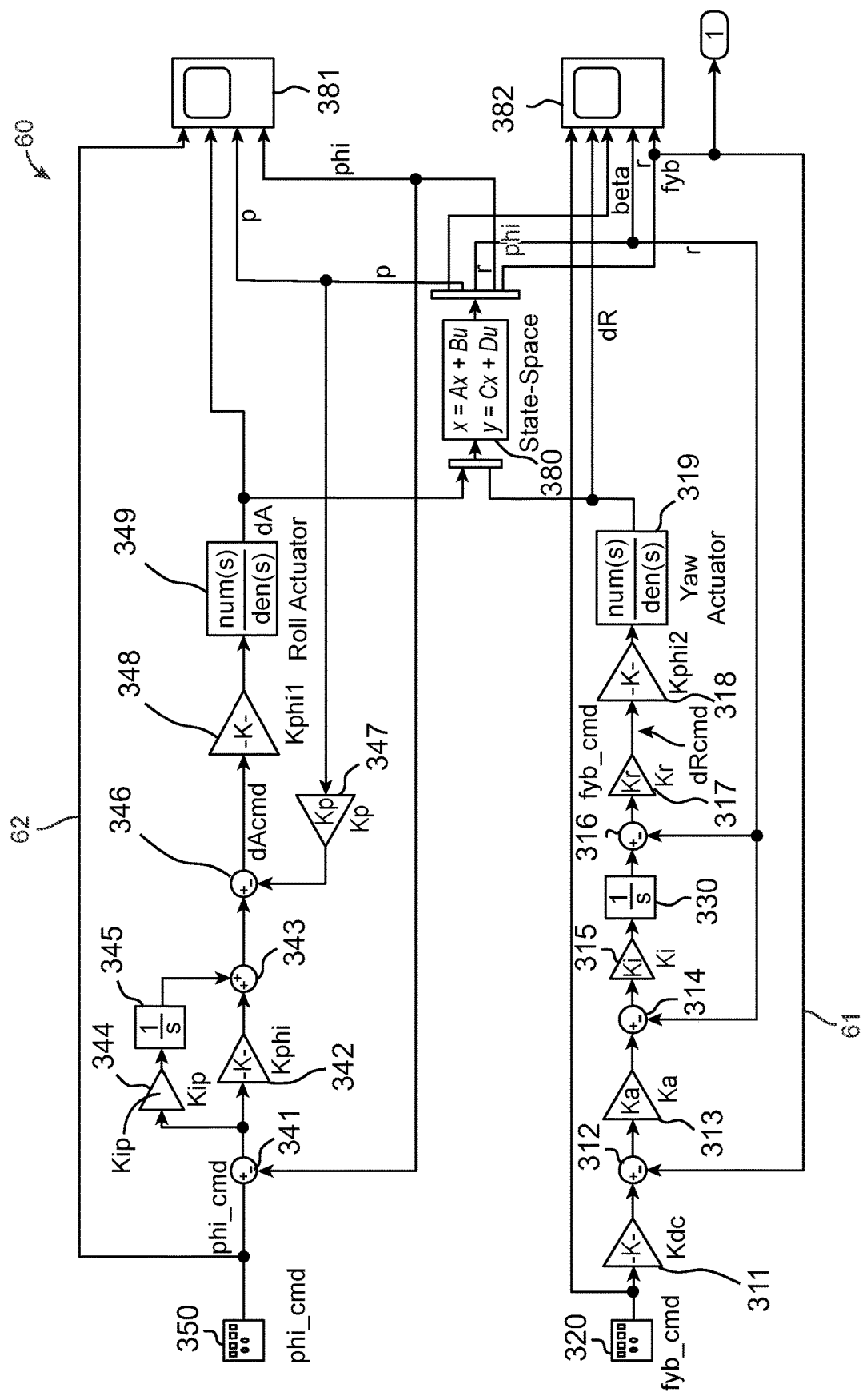
FIG. 4A shows a block diagram of a coupled bank-to-turn/skid-to-turn guidance system, according to an embodiment of the disclosure.

FIG. 4A shows a coupled bank-to-turn and skid-to-turn guidance system 60 using linear plant dynamics. The system 60 may include a loop 62 implementing bank-to-turn guidance and a loop 61 implementing a skid-to-turn guidance. In some embodiments, both loops 61,62 may be executed concurrently. A body side specific force command module 320 is configured to generate a skid-to-turn signal. A roll angle command module 350 may be configured to set to a non-zero value for generating a bank-to-turn signal with a lower bandwidth than the skid-to-turn signal generated by the body side specific force command module 320.

The loop 62 is configured to implement bank-to-turn inner control guidance processing, where in one embodiment the loop 62 comprises processor modules 341, 342, 343, 344, 345, 346, and 347. These include the roll angle error summing junction 341, the roll angle error proportional gain 342, the roll rate command proportional and integral summing junction 343, the roll angle error integral gain 344, the roll angle error integrator 345, the roll rate error summing junction 346, and the roll rate feedback gain 347.

The loop 61 is configured to implement skid-to-turn guidance processing, where in one embodiment the loop 61 comprises processor modules 311, 312, 313, 314, 315, 330, 316, and 317. These include the skid-to-turn steady state gain 311, the skid-to-turn acceleration error summing junction 312, the skid-to-turn acceleration error gain 313, the skid-to-turn rate error command summing junction 314, the skid-to-turn rate error integrator gain 315, the rudder integrator module 330, the skid-to-turn rate error summing block 316, and the skid-to-turn rudder command control gain 317.

Figure 4B:
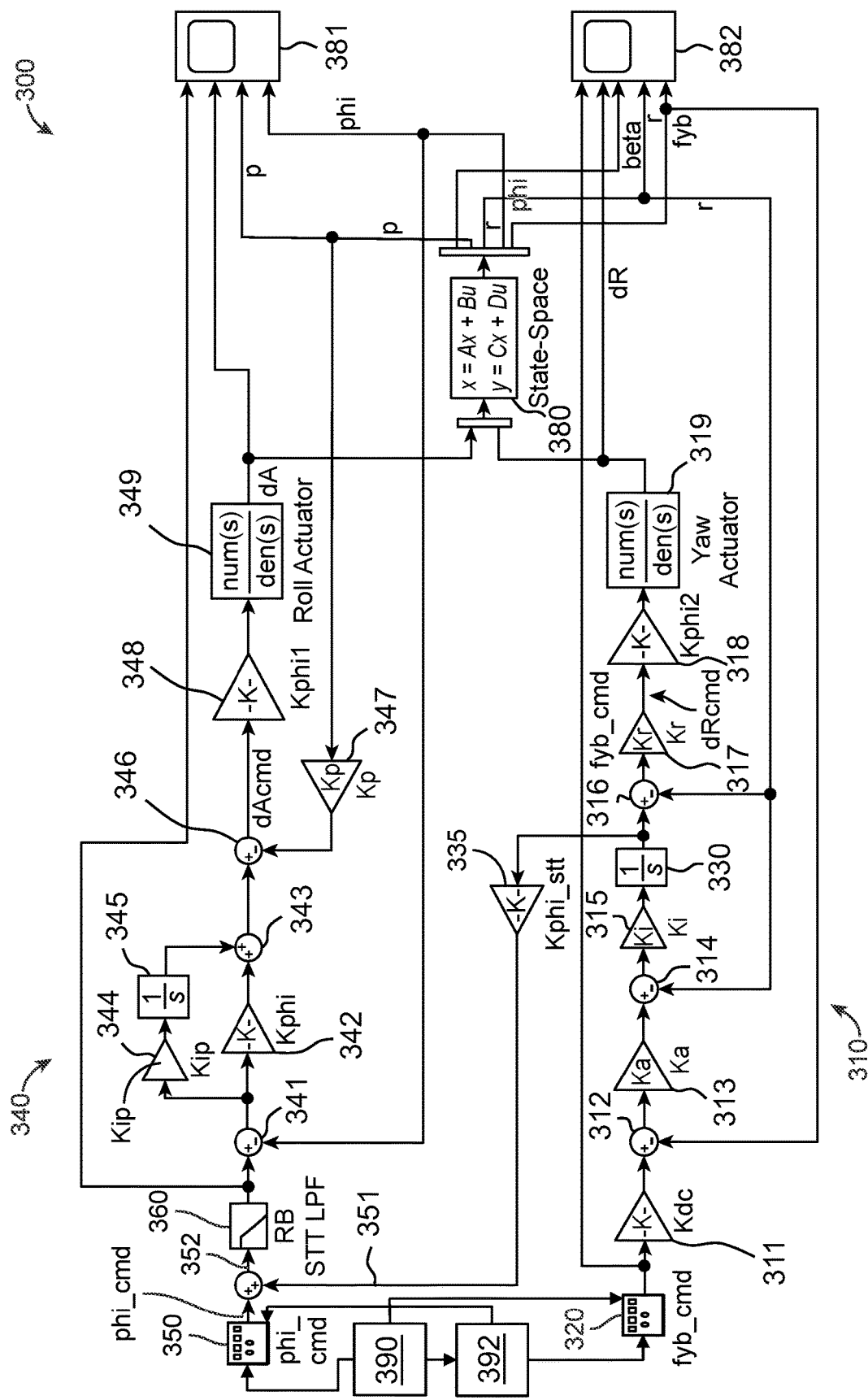
FIG. 4B depicts a block diagram of an embodiment of the guidance control method and system, according to an embodiment of the disclosure.

FIG. 4B depicts a block diagram of an embodiment of the guidance control method and system 300, disclosed herein. The system 300 includes a loop 310 for implementing skid-to-turn (STT) guidance and a loop 340 for implementing bank-to-turn (BTT) guidance coupled to the STT loop 310 by linear plant dynamics and rudder integrator feedback.

In one embodiment, the STT loop 310 comprises a body side specific force command module 320 for generating a skid-to-turn signal and a rudder integrator module 330. In one embodiment, the BTT loop 340 may include a roll angle command module 350 set to a non-zero value for generating a bank-to-turn signal with a lower bandwidth than the skid-to-turn signal generated by the body side specific force command module 320.

The bank-to-turn signal from the roll angle command module 350 is augmented at a command junction module by including, e.g., adding, a rudder integrator feedback gain 335 from the rudder integrator module 330. The rudder integrator signal 351 is the rudder integrator feedback signal for the rudder integrator 330. The rudder integrator 330 is multiplied by the rudder integrator feedback gain 335, to generate rudder integrator signal 351. The augmented bank-to-turn signal 352 may be input into a main filter module 360. The main filter 360 can decouple the outer loop 340 and the inner loop 310.

The "rudder integrator feedback" portion includes the rudder integrator 330, the rudder integrator feedback gain 335, and the bank-to-turn component due to rudder integrator feedback 351. The low-pass filter of the main filter module 360 ensures the bank-to-turn signal has lower bandwidth than the skid-to-turn controller. In one embodiment, the bank-to-turn inner control loop comprises processor modules 341, 342, 343, 344, 345, 346, and 347. These include the roll angle error summing junction 341, the roll angle error proportional gain 342, the roll rate command proportional and integral summing junction 343, the roll angle error integral gain 344, the roll angle error integrator 345, the roll rate error summing junction 346, and the roll rate feedback gain 347.

What is shown in FIG. 4B is a proportional-integral-derivative (PID)-feedback control loop. In some embodiments, this "inner control loop" may use other architectures while still maintaining roll-biased skid-to-turn as in the disclosed system and method. In one embodiment, the skid-to-turn inner loop controller comprises processor modules 311, 312, 313, 314, 315, 330, 316, and 317. These include the skid-to-turn steady state gain 311, the skid-to-turn acceleration error summing junction 312, the skid-to-turn acceleration error gain 313, the skid-to-turn rate error command summing junction 314, the skid-to-turn rate error integrator gain 315, the rudder integrator module 330, the skid-to-turn rate error summing block 316, and the skid-to-turn rudder command control gain 317.

FIG. 4B shows a 3-loop inner loop control architecture. In some embodiments, a different inner loop control architecture may be substituted while maintaining the disclosed roll-biased skid-to-turn algorithm. FIG. 4B also shows the roll aileron command dynamic pressure scaling gain 348, roll aileron actuator transfer function model 349, roll signal scope 381, skid-to-turn rudder command dynamic pressure scaling gain 318, skid-to-turn rudder actuator transfer function model 319, vehicle lateral dynamics state-space model 380, and skid-to-turn signal scope 382. The scopes 381, 382 may be used to display the time histories of the signals. The scopes 381, 382 may be used for visualization and/or analysis in simulation. The scopes 381, 382 may not be a part of the algorithm or be run on the processor (101, FIG. 3). One or more optical sensors 390 provide a body to target line of sight. One or more differentiators 392 provide a line of sight rate.

Figure 4C:
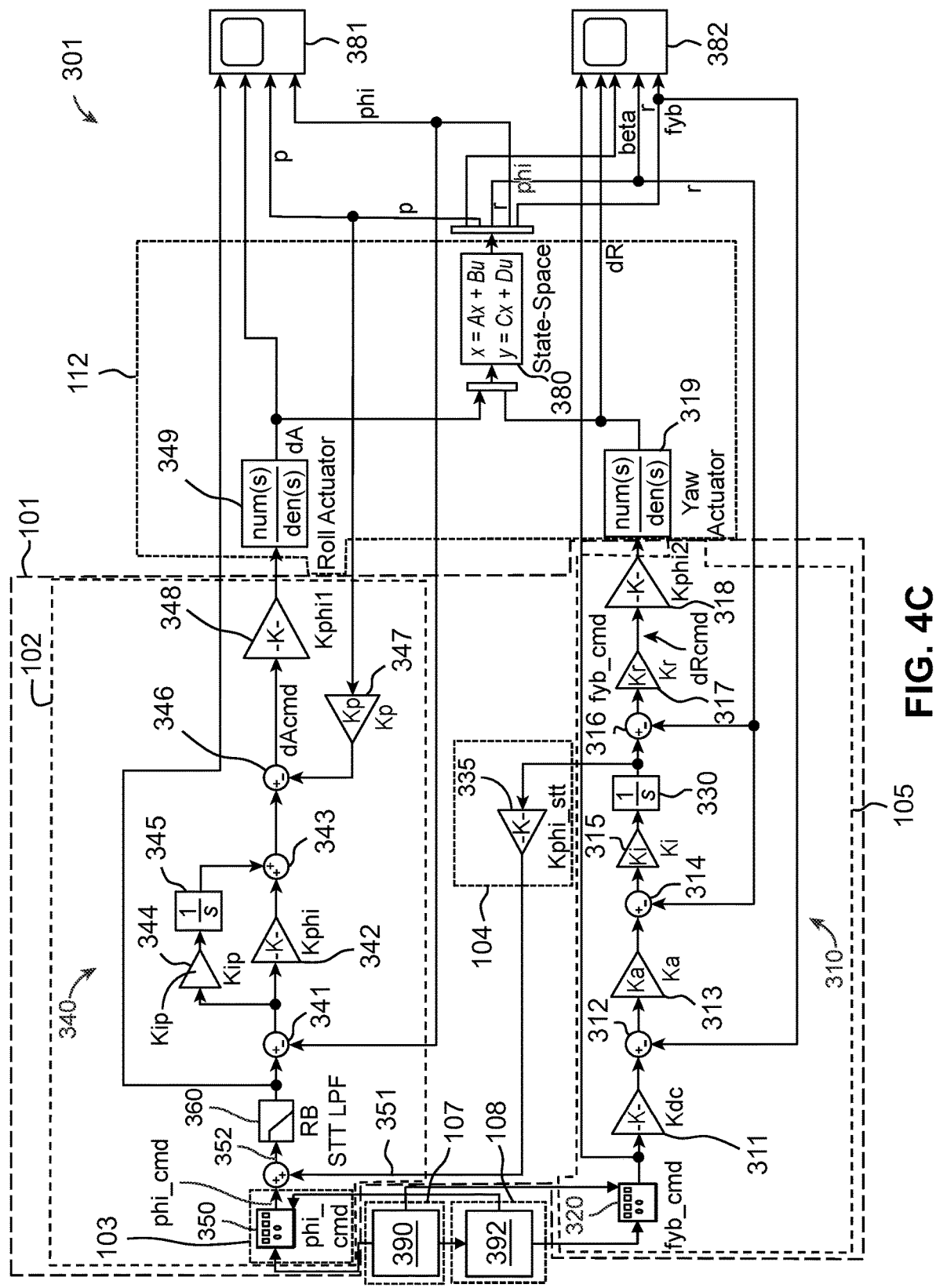
FIG. 4C depicts a block diagram of an embodiment of the guidance control method and system, according to an embodiment of the disclosure.

FIG. 4C depicts a block diagram of an embodiment of the guidance control method and system 301, according to an embodiment of the disclosure. FIG. 4C is an example implementation of FIG. 3. The elements of FIG. 3 are mapped to the elements in the embodiment of FIG. 4C. Referring to FIGS. 3 and 4C, the processor 101 may include the elements: the loop 310 for implementing skid-to-turn (STT) guidance, the skid-to-turn steady state gain 311, the skid-to-turn acceleration error summing junction 312, the skid-to-turn acceleration error gain 313, the skid-to-turn rate error command summing junction 314, the skid-to-turn rate error integrator gain 315, the skid-to-turn rate error summing block 316, the skid-to-turn rudder command control gain 317, the skid-to-turn rudder command dynamic pressure scaling gain 318, the body side specific force command module 320, the rudder integrator feedback gain 335, the loop 340 for implementing bank-to-turn (BTT) guidance, the roll angle error summing junction 341, the roll angle error proportional gain 342, the roll rate command proportional and integral summing junction 343, the roll angle error integral gain 344, the roll angle error integrator 345, the roll rate error summing junction 346, the roll rate feedback gain 347, the roll aileron command dynamic pressure scaling gain 348, the roll angle command module 350, the rudder integrator signal 351, the augmented bank-to-turn signal 352, and the main filter module 360. The bank-to-turn module 102 may include the elements: the loop 340 for implementing bank-to-turn (BTT) guidance, the roll angle error summing junction 341, the roll angle error proportional gain 342, the roll rate command proportional and integral summing junction 343, the roll angle error integral gain 344, the roll angle error integrator 345, the roll rate error summing junction 346, the roll rate feedback gain 347, the roll aileron command dynamic pressure scaling gain 348, the roll angle command module 350, the rudder integrator signal 351, the augmented bank-to-turn signal 352, and the main filter module 360. The low pass filter 103 may include the element: the roll angle command module 350. The rudder integrator module 104 may include the element: the rudder integrator feedback gain 335. The skid-to-turn module 105 may include the elements: the loop 310 for implementing skid-to-turn (STT) guidance, the skid-to-turn steady state gain 311, the skid-to-turn acceleration error summing junction 312, the skid-to-turn acceleration error gain 313, the skid-to-turn rate error command summing junction 314, the skid-to-turn rate error integrator gain 315, the skid-to-turn rate error summing block 316, the skid-to-turn rudder command control gain 317, the skid-to-turn rudder command dynamic pressure scaling gain 318, the body side specific force command module 320. The optical sensors 107 may include the element: the optical sensors 390. The differentiator 108 may include the element: the differentiator 392. The vehicle plant dynamics 112 may include the elements: the skid-to-turn rudder actuator transfer function model 319, the roll aileron actuator transfer function model 349, and the vehicle lateral dynamics state-space model 380.

The optical sensors 390 may provide a body to target line of sight to the differentiator 392, the body side specific force command module 320, and the roll angle command module 350. The differentiator 392 may receive the body to target line of sight from the optical sensors 390. The differentiator 392 may provide a line of sight rate to the body side specific force command module 320, and the roll angle command module 350.

The body side specific force command module 320 may receive the body to target line of sight from the optical sensors 390 and the line of sight rate from the differentiator 392. The body side specific force command module 320 may output a signal based on the received body to target line of sight and the line of sight rate to the skid-to-turn steady state gain 311.

The skid-to-turn steady state gain 311 may receive the signal from the body side specific force command module 320. The skid-to-turn steady state gain 311 may output a signal to the skid-to-turn acceleration error summing junction 312. The skid-to-turn acceleration error summing junction 312 may output a signal to the skid-to-turn acceleration error gain 313. The skid-to-turn acceleration error gain 313 may output a signal to the skid-to-turn rate error command summing junction 314. The skid-to-turn rate error command summing junction 314 may output a signal to the skid-to-turn rate error integrator gain 315. The skid-to-turn rate error integrator gain 315 may output a signal to the rudder integrator module 330. The rudder integrator module 330 may output a signal to the skid-to-turn rate error summing block 316 and the rudder integrator feedback gain 335. The rudder integrator 330 is multiplied by the rudder integrator feedback gain 335, to generate rudder integrator signal 351. The skid-to-turn rate error summing block 316 may output a signal to the skid-to-turn rudder command control gain 317. The skid-to-turn rudder command control gain 317 may output a signal to the skid-to-turn rudder command dynamic pressure scaling gain 318.

The roll angle command module 350 may receive the body to target line of sight from the optical sensors 390 and the line of sight rate from the differentiator 392. The roll angle command module 350 may output a signal based on the received body to target line of sight and the line of sight rate that is summed with the generated rudder integrator signal 351 to output the augmented bank-to-turn signal 352.

The augmented bank-to-turn signal 352 may be input into a main filter module 360. The main filter module 360 may decouple the outer loop 340 and the inner loop 310. The main filter module 360 may output a signal to the roll angle error summing junction 341. The roll angle error summing junction 341 may output a signal to the roll angle error proportional gain 342 and the roll angle error integral gain 344. The roll angle error integral gain 344 may output a signal to the roll angle error integrator 345. The roll angle error integrator 345 may output a signal to the roll rate command proportional and integral summing junction 343. The roll angle error proportional gain 342 may output a signal to the roll rate command proportional and integral summing junction 343. The roll rate command proportional and integral summing junction 343 may sum the signals from the roll angle error integrator 345 and the roll angle error proportional gain 342. The roll rate command proportional and integral summing junction 343 may output a signal to the roll rate error summing junction 346. The roll rate error summing junction 346 may receive a signal from the roll rate command proportional and integral summing junction 343 and the roll rate feedback gain 347. The roll rate error summing junction 346 may output a signal to the roll aileron command dynamic pressure scaling gain 348.

The skid-to-turn rudder actuator transfer function model 319 may receive a signal from the skid-to-turn rudder command dynamic pressure scaling gain 318. The skid-to-turn rudder actuator transfer function model 319 may output a signal to the vehicle lateral dynamics state-space model 380. The roll aileron actuator transfer function model 349 may receive a signal from the roll aileron command dynamic pressure scaling gain 348. The roll aileron actuator transfer function model 349 may output a signal to the vehicle lateral dynamics state-space model 380.

Figure 4D:
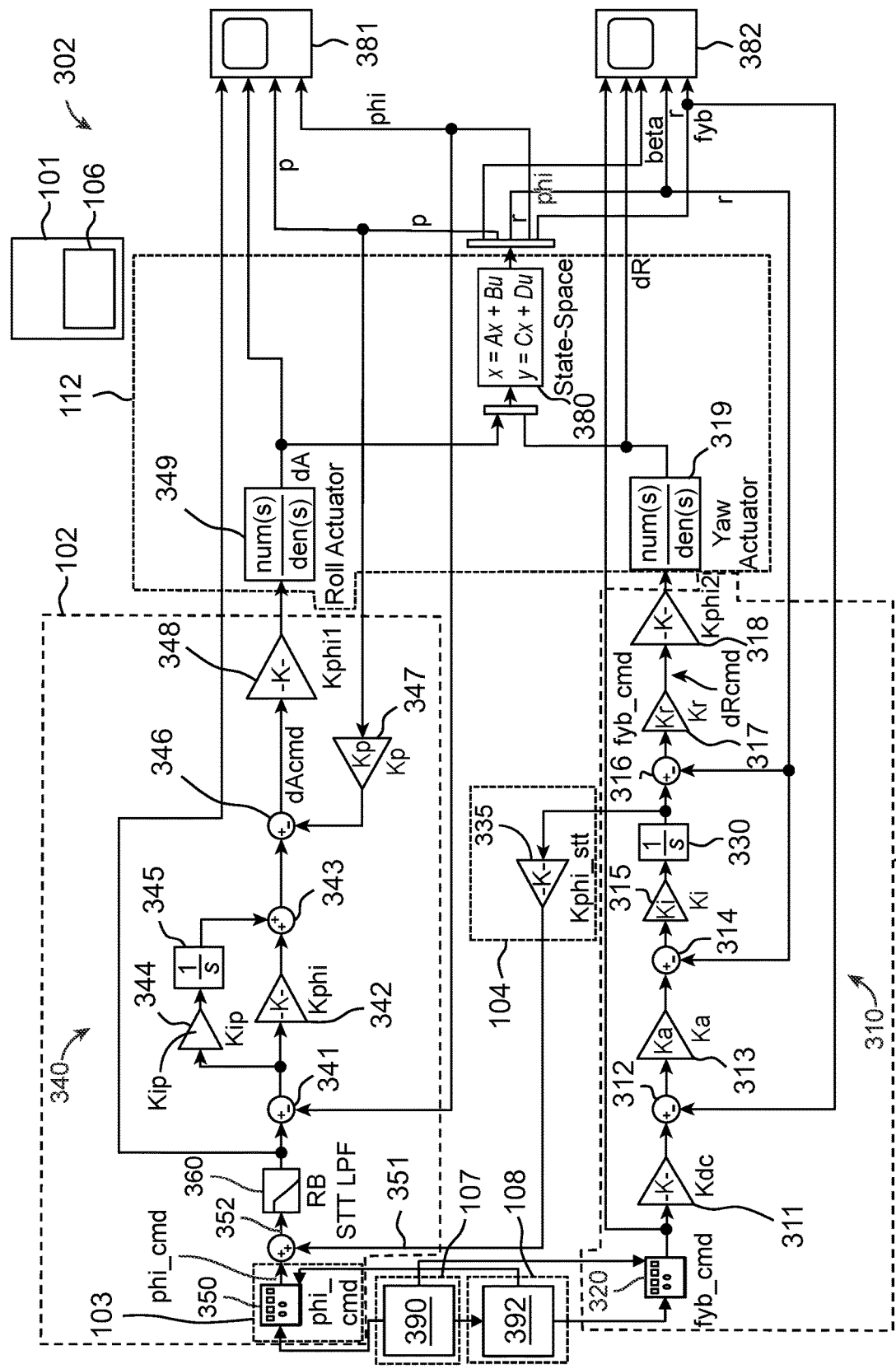
FIG. 4D depicts a block diagram of an embodiment of the guidance control method and system, according to an embodiment of the disclosure.

FIG. 4D depicts a block diagram of an embodiment of the guidance control method and system 302, according to an embodiment of the disclosure. FIG. 4D is an example implementation of FIG. 3. The processor 101 having addressable memory 106 may be in communication with one or more modules. The one or more modules may be embodiment as logic circuits and/or analog circuits in communication with the processor 101. These logic circuits and/or analog circuits may include the loop 310 for implementing skid-to-turn (STT) guidance, the skid-to-turn steady state gain 311, the skid-to-turn acceleration error summing junction 312, the skid-to-turn acceleration error gain 313, the skid-to-turn rate error command summing junction 314, the skid-to-turn rate error integrator gain 315, the skid-to-turn rate error summing block 316, the skid-to-turn rudder command control gain 317, the skid-to-turn rudder command dynamic pressure scaling gain 318, the body side specific force command module 320, the rudder integrator feedback gain 335, the loop 340 for implementing bank-to-turn (BTT) guidance, the roll angle error summing junction 341, the roll angle error proportional gain 342, the roll rate command proportional and integral summing junction 343, the roll angle error integral gain 344, the roll angle error integrator 345, the roll rate error summing junction 346, the roll rate feedback gain 347, the roll aileron command dynamic pressure scaling gain 348, the roll angle command module 350, the rudder integrator signal 351, the augmented bank-to-turn signal 352, the main filter module 360, the skid-to-turn rudder actuator transfer function model 319, the roll aileron actuator transfer function model 349, the vehicle lateral dynamics state-space model 380, the optical sensors 390, and/or the differentiator 392.

Figure 5:
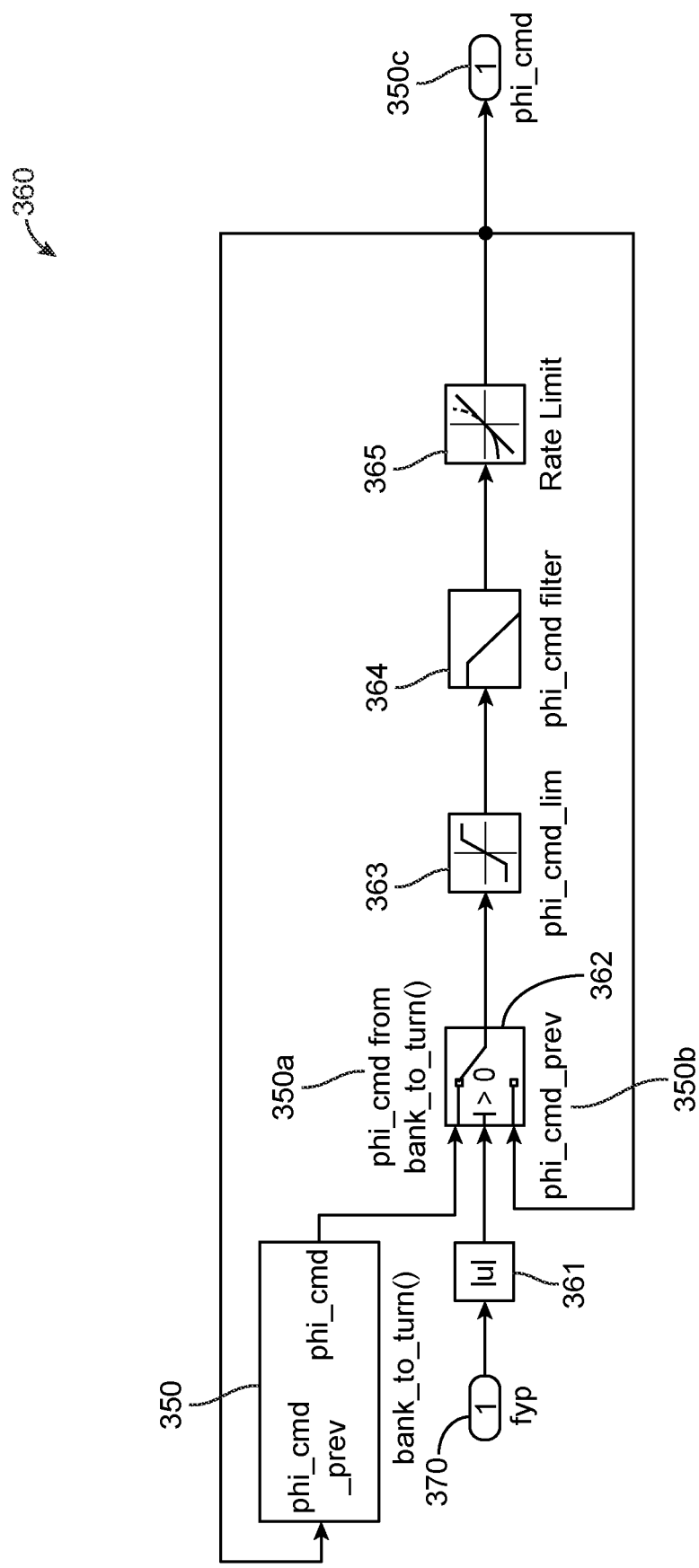
FIG. 5 depicts a block diagram of an implementation of the main filter module, according to an embodiment of the disclosure.

FIG. 5 depicts a block diagram of an implementation of the main filter module 360, according to an embodiment. In one embodiment, the threshold check for altering the bank-to-turn signal comprises processor modules 370, 361, 350a, 350b, and 362. In one embodiment, the bank-to-turn filter comprises processor modules 363, 364, and 365 comprise, ensuring the bank-to-turn signal has a lower bandwidth than the skid-to-turn signal. The main filter module 360 receives a current roll angle command input 350a from the roll angle command module 350 and a previous roll angle command input 350b as data inputs and generates a roll angle command filter output 350c. Switch 362, saturation limit 361, low pass filter 364, and slew rate limit 365 are steps in generating the bank-to-turn signal 350c. In one embodiment, the roll angle command module 350 implements a bank-to-turn method and process. The main filter module 360 utilizes an absolute value module 361 to determine the absolute value of a body side specific force input 370 from the body side specific force command module 320, as a control input.

In one embodiment, the main filter module 360 comprises a switch module 362 for switching between the signals from the current roll angle command module 350a and the previous roll angle command module 350b. In one example, the switch module 362 implements switching by determining whether the absolute value of a body side specific force input 370 meets a side force threshold. If the side force threshold is met, the switch module 362 outputs the signal from the current roll angle command module 350a. If the side threshold is not met, the switch module 362 may output the signal from the previous roll angle command module 350b. The output of the switch module 362 is then filtered through a saturation limit module 363, a first-order low pass filter module 364, and a rate limit module 365, before being output as the roll angle command output signal 350c.

Figure 6:
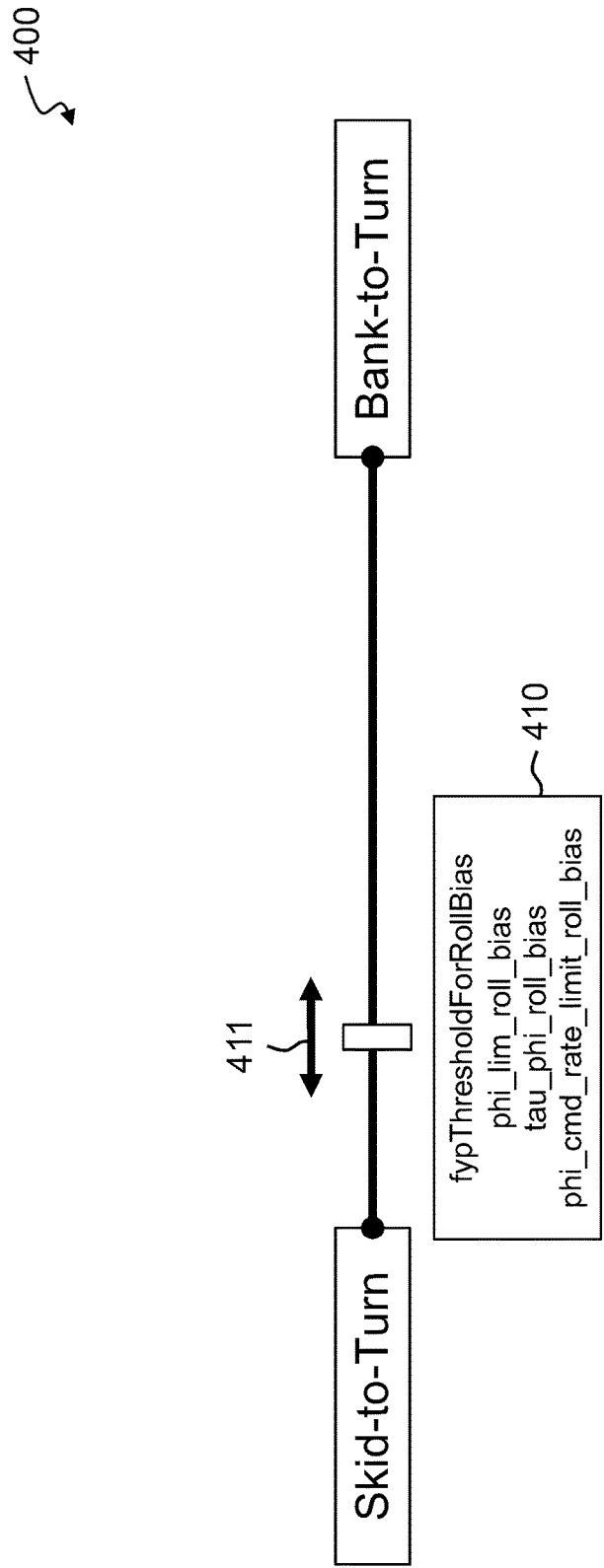
FIG. 6 illustrates an overall configuration of the main filter module, according to an embodiment of the disclosure.

FIG. 6 illustrates an overall configuration of the main filter module 400, according to an embodiment of the disclosure. The main filter module 400 may be configured by adjusting a set of gains 410 to tune 411 the bank-to-turn dynamics. In one embodiment, all these gains may be tuned to achieve the desired response.

Figure 7:
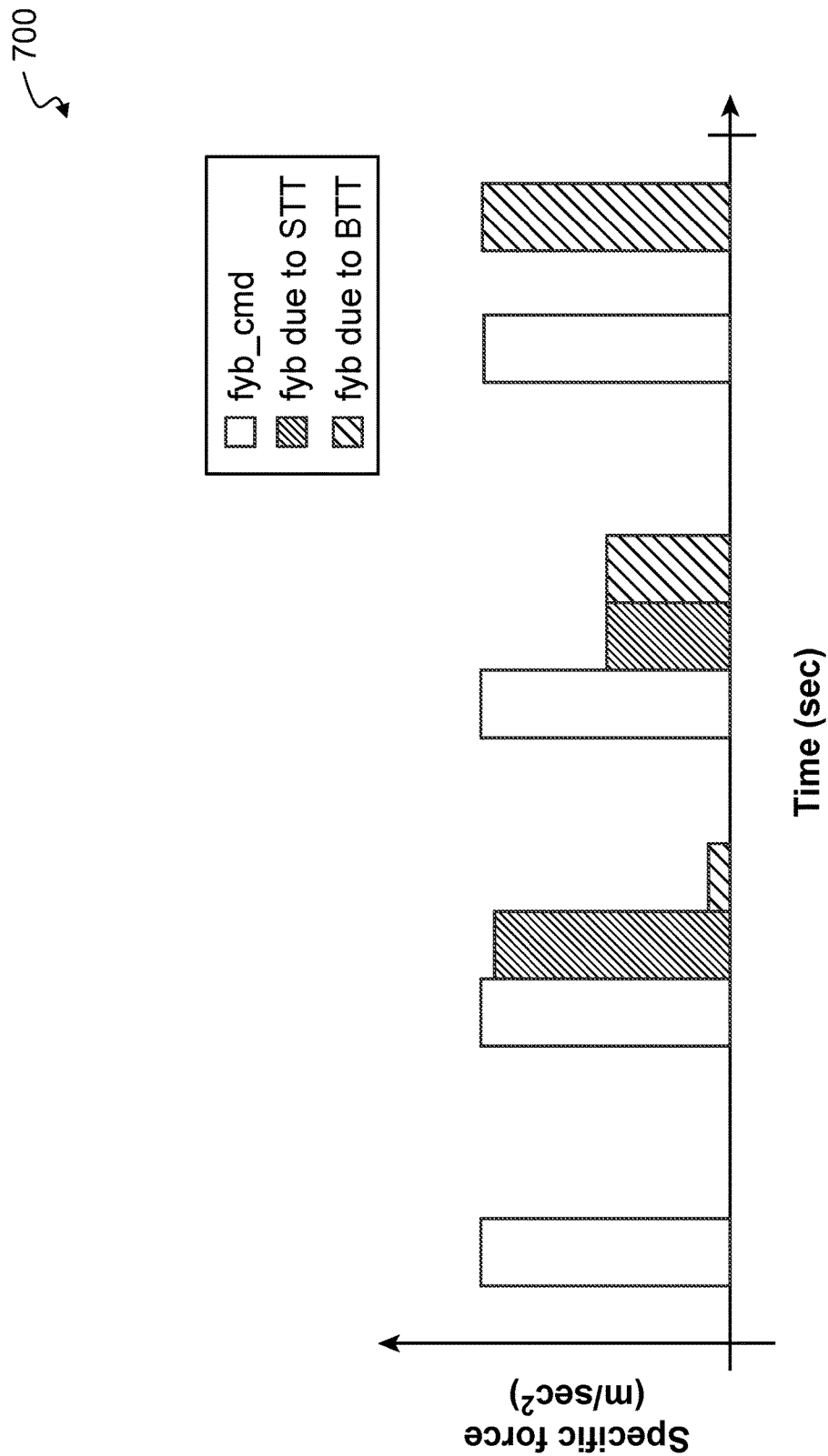
FIG. 7 illustrates the contributions from the skid-to-turn guidance and bank-to-turn guidance changing over time, according to an embodiment of the disclosure.

FIG. 7 illustrates the contributions 700 from the skid-to-turn guidance and bank-to-turn guidance changing over time when a side force threshold has been met, according to an embodiment of the disclosure. As time passes and the aircraft approaches the target, the contribution 700 shifts from the skid-to-turn (STT) signal to the bank-to-turn (BTT) signal. Fyb_cmd is a side force command. Fyb_cmd due to STT is a side force command due to skid-to-turn. Fyb_cmd due to BTT is a side force command due to bank-to-turn.

Figure 8:
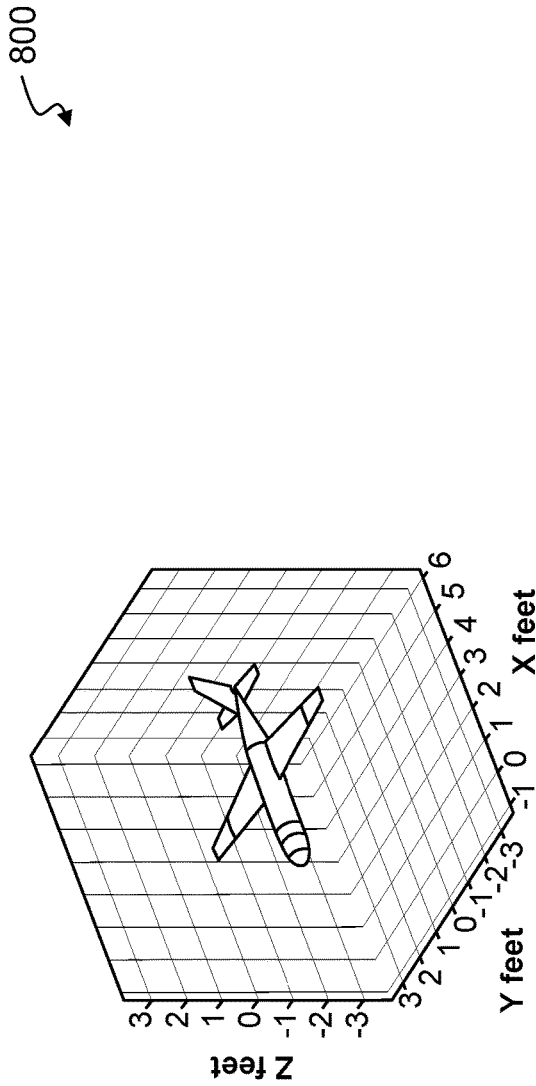
FIG. 8 illustrates an example airframe model in simulations and testing, according to an embodiment of the disclosure.

FIG. 8 illustrates an example airframe model 800 in simulations and testing, according to an embodiment of the disclosure. The airframe used for the results of FIG. 8 is a scaled Citation II Model 550 Aircraft. The mass may be 33.105 lbm. The reference area may be 701.6623 in$^2$. The reference chord may be 10.1250 in. The reference span may be 69.3000 in. The reference center of gravity may be −32.8500 in, from nose. Other airframes and airframe parameters are possible and contemplated.

FIG. 9A illustrates a step response 900 in response to step input in Fyb_cmd (side force command) from a typical skid-to-turn guidance system.

FIG. 9B illustrates a step response 902 from the skid-to-turn guidance augmented with bank-to-turn guidance and rudder integrator feedback based on guidance according to an embodiment of the disclosure.

FIG. 10A illustrates a table 1000 containing time domain response data. For a base skid-to-turn the rise time may be about 2.137 seconds and the settling time may be about 3.030 seconds. For a roll-biased skid-to-turn with rudder integrator feedback the rise time may be about 1.170 seconds and the settling time may be about 2.159 seconds. The rise time and settling time for the roll-biased skid-to-turn with rudder integrator feedback control architecture is lower than the rise time and settling time for the base skid-to-turn control architecture.

FIG. 10B illustrates a table 1002 containing circle error probable results, according to embodiments of the disclosure. A circular probable error (CEP) is defined as the radius of a circle centered at the aimpoint, which has a 50% probability of hit. P90 means 90% of the estimates exceed the P90 estimate. The bank-to-turn control architecture may have a CEP of about 0.188 and a P90 of about 0.681 for a stationary target, and a CEP of about 0.272 and a P90 of about 1.065 for a moving target. The skid-to-turn control architecture may have a CEP of about 0.159 and a P90 of about 0.711 for a stationary target, and a CEP of about 0.259 and a P90 of about 1.271 for a moving target. The roll-biased skid-to-turn with rudder integral feedback control architecture may have a CEP of about 0.115 and a P90 of about 0.315 for a stationary target, and a CEP of about 0.236 and a P90 of about 0.656 for a moving target.

Figure 11A:
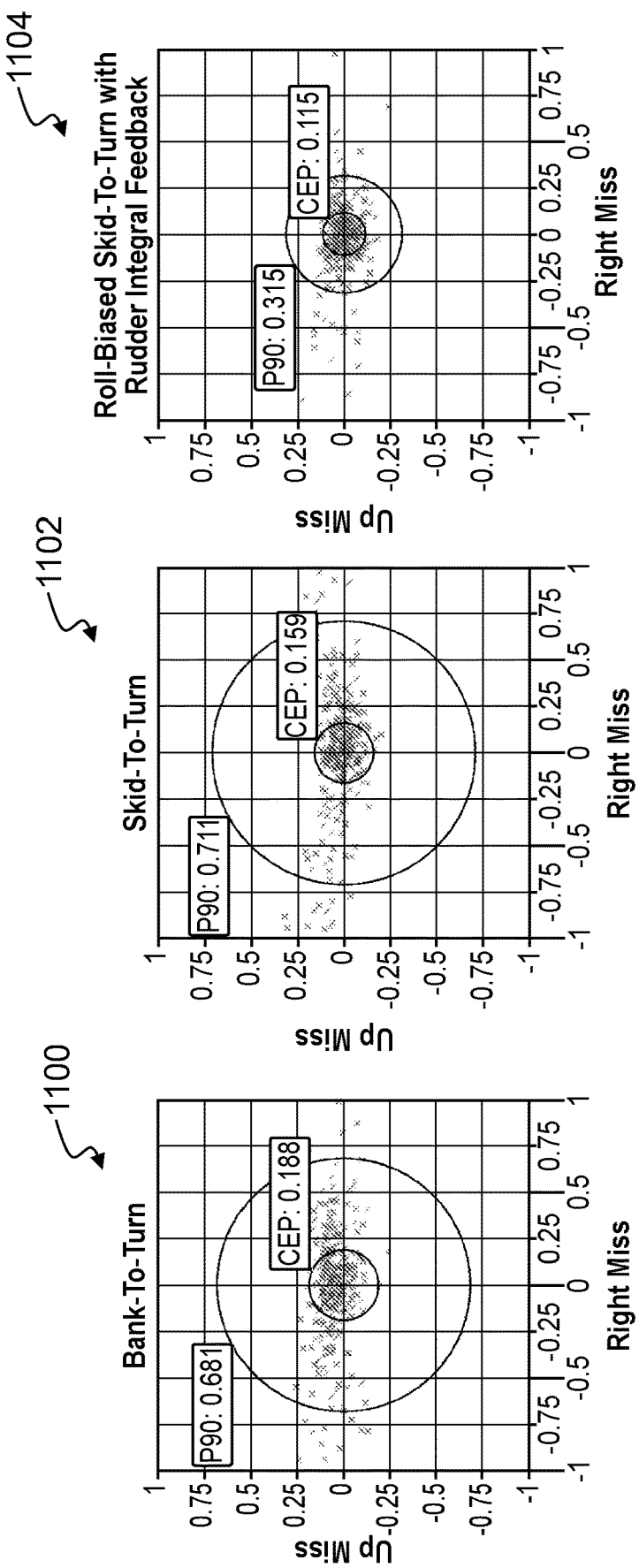
FIG. 11A illustrates terminal guidance miss distance for stationary targets, according to an embodiment of the disclosure.

FIG. 11A illustrates terminal guidance miss distance for stationary targets, based on BTT 1100, STT 1102, and roll-biased skid-to-turn guidance with rudder integrator feedback 1104 according to one embodiment disclosed herein.

Figure 11B:
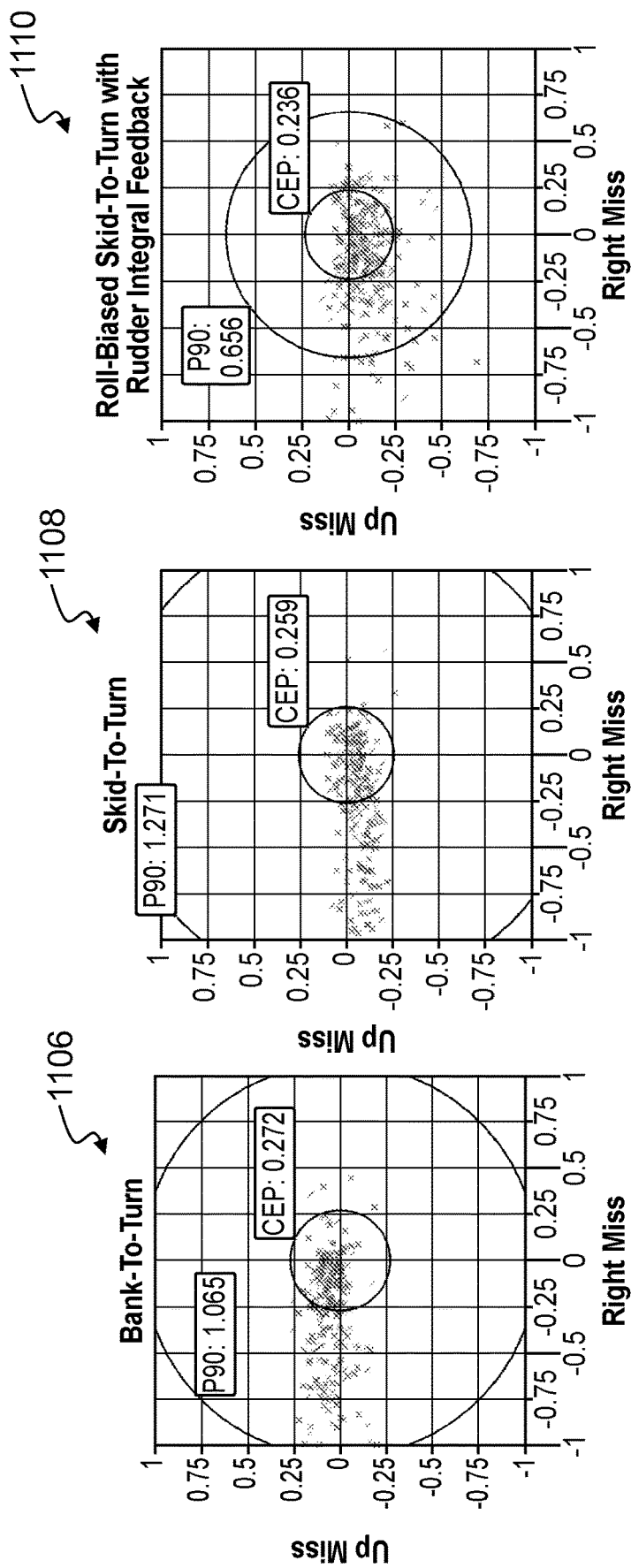
FIG. 11B depicts terminal guidance miss distance for moving targets, according to an embodiment of the disclosure.

FIG. 11B depicts terminal guidance miss distance for moving targets, based on BTT 1106, STT 1108, and roll-biased skid-to-turn guidance with rudder integrator feedback 1110 according to one embodiment disclosed herein. As such, FIGS. 11A and 11B illustrate that improvement is shown when using the disclosed system and method herein for a roll-biased skid-to-turn guidance with rudder integrator feedback over a STT guidance alone, and BTT guidance alone.

Figure 12:
FIG. 12 is a graphical illustration of a moving target, according to an embodiment of the disclosure.

FIG. 12 is a graphical illustration 1200 of a moving target, according to an embodiment of the disclosure. The moving target is moving at, e.g., about 18 miles per hour. The disclosed system and method herein for a roll-biased skid-to-turn guidance with rudder integrator feedback may be used to more accurately impact this target as compared to a STT guidance alone and a BTT guidance alone.

Figure 13:
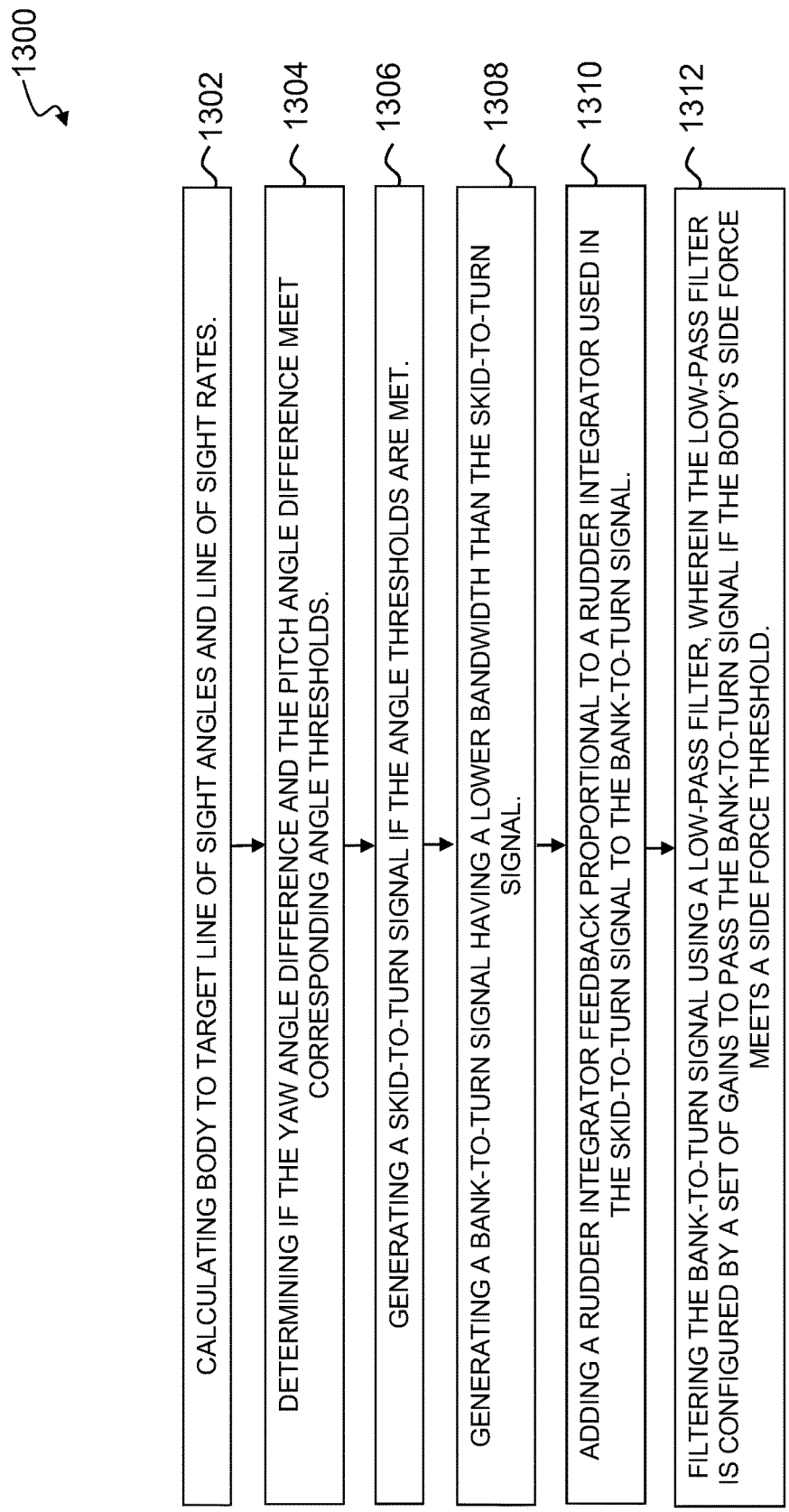
FIG. 13 depicts a method embodiment for guiding a missile using a bank-to-turn signal and a skid-to-turn signal.

FIG. 13 depicts a flow chart for a guidance method embodiment 1300, according to an embodiment of the disclosure. The method 1300 may begin with calculating body to target line of sight angles and line of sight rates (step 1302). After the target line of sight angles and line of sight rates have been calculated, the method 1300 may then include determining if the yaw angle difference and the pitch angle difference meet corresponding angle thresholds (step 1304). If the angle thresholds are met, the method 1300 may then generate a skid-to-turn signal (step 1306) and a generate a bank-to-turn signal having a lower bandwidth than the skid-to-turn signal (step 1308). After both the bank-to-turn and skid-to-turn signals have been generated, a rudder integrator feedback signal is added to the bank-to-turn signal, wherein the rudder integrator feedback signal is proportional to a rudder integrator (step 1310). In one implementation, after both the bank-to-turn and skid-to-turn signals have been generated, the method may then add the rudder integrator feedback signal to the skid-to-turn signal and to the bank-to-turn signal. The method 1300 may then filtering the bank-to-turn signal using a low-pass filter that has been configured by a set of gains to pass the bank-to-turn signal if the body's side force meets a side force threshold (step 1312).

Figure 14:
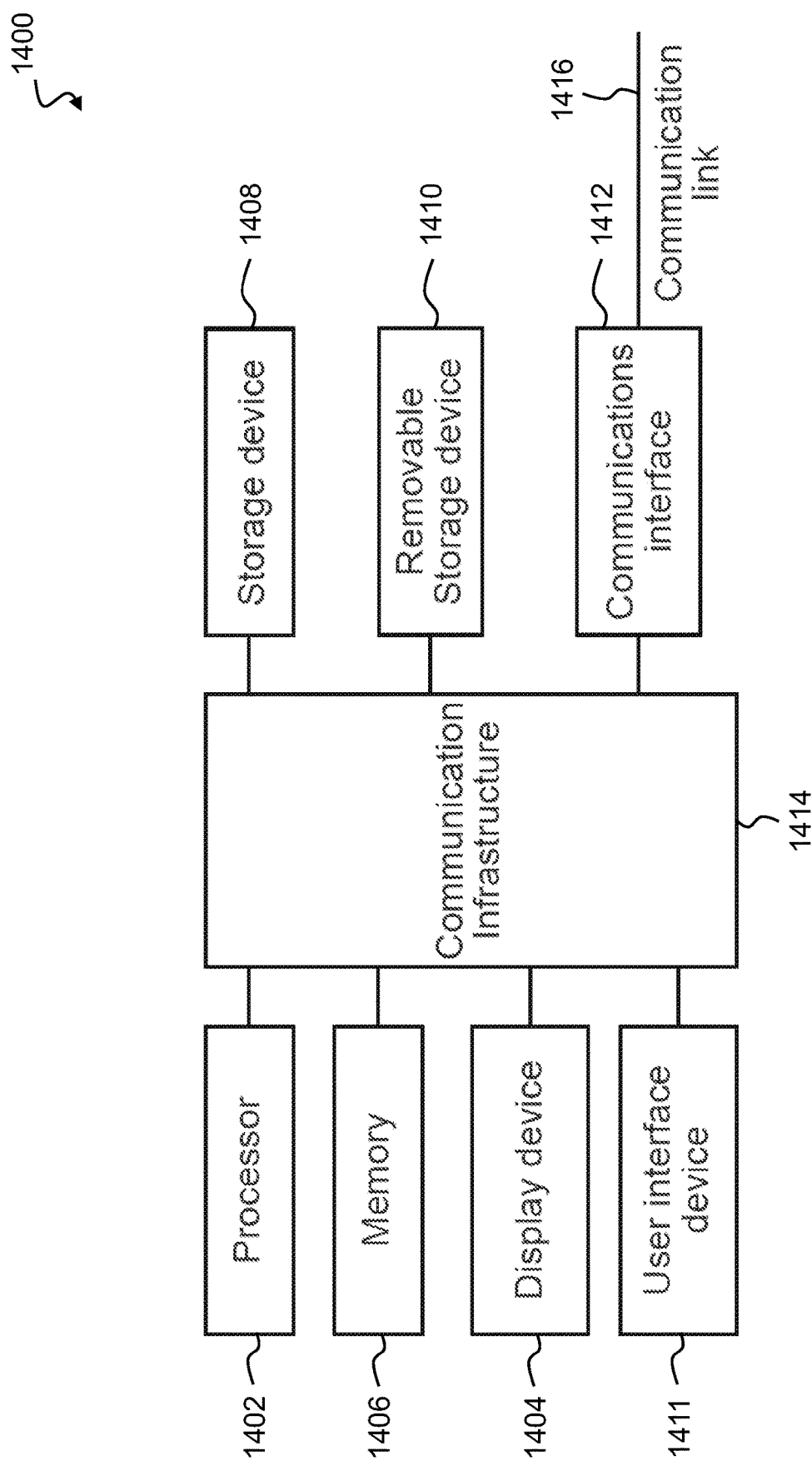
FIG. 14 shows a high-level block diagram and process of a computing system for implementing an embodiment of the system and process.

FIG. 14 is a high-level block diagram 1400 showing a computing system comprising a computer system useful for implementing an embodiment of the system and process, disclosed herein. Embodiments of the system may be implemented in different computing environments. The computer system includes one or more processors 1402, and can further include an electronic display device 1404 (e.g., for displaying graphics, text, and other data), a main memory 1406 (e.g., random access memory (RAM)), storage device 1408, a removable storage device 1410 (e.g., removable storage drive, a removable memory module, a magnetic tape drive, an optical disk drive, a computer readable medium having stored therein computer software and/or data), user interface device 1411 (e.g., keyboard, touch screen, keypad, pointing device), and a communication interface 1412 (e.g., modem, a network interface (such as an Ethernet card), a communications port, or a PCMCIA slot and card). The communication interface 1412 allows software and data to be transferred between the computer system and external devices. The system further includes a communications infrastructure 1414 (e.g., a communications bus, cross-over bar, or network) to which the aforementioned devices/modules are connected as shown.

Information transferred via communications interface 1414 may be in the form of signals such as electronic, electromagnetic, optical, or other signals capable of being received by communications interface 1414, via a communication link 1416 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 1412. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 15:
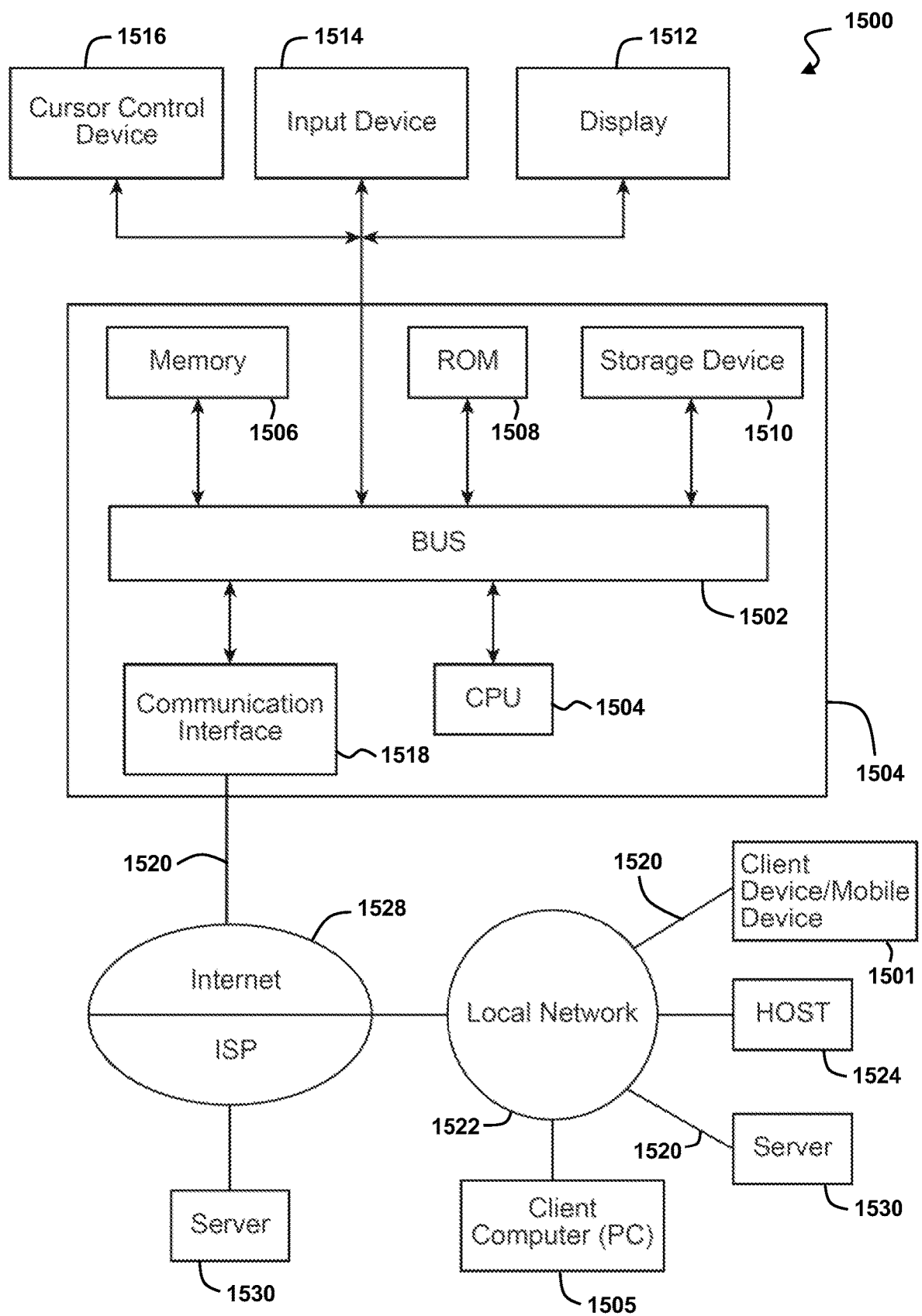
FIG. 15 shows a block diagram and process of an exemplary system in which an embodiment may be implemented.

FIG. 15 shows a block diagram of an example system 1500 in which an embodiment may be implemented. The system 1500 includes one or more client devices 1501 such as consumer electronics devices, connected to one or more server computing systems 1530. A server 1530 includes a bus 1502 or other communication mechanism for communicating information, and a processor (CPU) 1504 coupled with the bus 1502 for processing information. The server 1530 also includes a main memory 1506, such as a random access memory (RAM) or other dynamic storage device, coupled to the bus 1502 for storing information and instructions to be executed by the processor 1504. The main memory 1506 also may be used for storing temporary variables or other intermediate information during execution or instructions to be executed by the processor 1504. The server computer system 1530 further includes a read only memory (ROM) 1508 or other static storage device coupled to the bus 1502 for storing static information and instructions for the processor 1504. A storage device 1510, such as a magnetic disk or optical disk, is provided and coupled to the bus 1502 for storing information and instructions. The bus 1502 may contain, for example, thirty-two address lines for addressing video memory or main memory 1506. The bus 1502 can also include, for example, a 32-bit data bus for transferring data between and among the components, such as the CPU 1504, the main memory 1506, video memory and the storage 1510. Alternatively, multiplex data/address lines may be used instead of separate data and address lines.

The server 1530 may be coupled via the bus 1502 to a display 1512 for displaying information to a computer user. An input device 1514, including alphanumeric and other keys, is coupled to the bus 1502 for communicating information and command selections to the processor 1504. Another type or user input device comprises cursor control 1516, such as a mouse, a trackball, or cursor direction keys for communicating direction information and command selections to the processor 1504 and for controlling cursor movement on the display 1512.

According to one embodiment, the functions are performed by the processor 1504 executing one or more sequences of one or more instructions contained in the main memory 1506. Such instructions may be read into the main memory 1506 from another computer-readable medium, such as the storage device 1510. Execution of the sequences of instructions contained in the main memory 1506 causes the processor 1504 to perform the process steps described herein. One or more processors in a multi-processing arrangement may also be employed to execute the sequences of instructions contained in the main memory 1506. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 1504 for execution. Such a medium may take many forms, including but not limited to, non-volatile media, volatile media, and transmission media. Non-volatile media includes, for example, optical or magnetic disks, such as the storage device 1510. Volatile media includes dynamic memory, such as the main memory 1506. Transmission media includes coaxial cables, copper wire and fiber optics, including the wires that comprise the bus 1502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 1504 for execution. For example, the instructions may initially be carried on a magnetic disk of a remote computer. The remote computer can load the instructions into its dynamic memory and send the instructions over a telephone line using a modem. A modem local to the server 1530 can receive the data on the telephone line and use an infrared transmitter to convert the data to an infrared signal. An infrared detector coupled to the bus 1502 can receive the data carried in the infrared signal and place the data on the bus 1502. The bus 1502 carries the data to the main memory 1506, from which the processor 1504 retrieves and executes the instructions. The instructions received from the main memory 1506 may optionally be stored on the storage device 1510 either before or after execution by the processor 1504.

The server 1530 also includes a communication interface 1518 coupled to the bus 1502. The communication interface 1518 provides a two-way data communication coupling to a network link 1520 that is connected to the world wide packet data communication network now commonly referred to as the Internet 1528. The Internet 1528 uses electrical, electromagnetic or optical signals that carry digital data streams. The signals through the various networks and the signals on the network link 1520 and through the communication interface 1518, which carry the digital data to and from the server 1530, are exemplary forms or carrier waves transporting the information.

In another embodiment of the server 1530, interface 1518 is connected to a network 1522 via a communication link 1520. For example, the communication interface 1518 may be an integrated services digital network (ISDN) card or a modem to provide a data communication connection to a corresponding type of telephone line, which can comprise part of the network link 1520. As another example, the communication interface 1518 may be a local area network (LAN) card to provide a data communication connection to a compatible LAN. Wireless links may also be implemented. In any such implementation, the communication interface 1518 sends and receives electrical electromagnetic or optical signals that carry digital data streams representing various types of information.

The network link 1520 typically provides data communication through one or more networks to other data devices. For example, the network link 1520 may provide a connection through the local network 1522 to a host computer 1524 or to data equipment operated by an Internet Service Provider (ISP). The ISP in turn provides data communication services through the Internet 1528. The local network 1522 and the Internet 1528 both use electrical, electromagnetic or optical signals that carry digital data streams. The signals through the various networks and the signals on the network link 1520 and through the communication interface 1518, which carry the digital data to and from the server 1530, are exemplary forms or carrier waves transporting the information.

The server 1530 can send/receive messages and data, including e-mail, program code, through the network, the network link 1520 and the communication interface 1518. Further, the communication interface 1518 can comprise a USB/Tuner and the network link 1520 may be an antenna or cable for connecting the server 1530 to a cable provider, satellite provider or other terrestrial transmission system for receiving messages, data and program code from another source.

The example versions of the embodiments described herein may be implemented as logical operations in a distributed processing system such as the system 1500 including the servers 1530. The logical operations of the embodiments may be implemented as a sequence of steps executing in the server 1530, and as interconnected machine modules within the system 1500. The implementation is a matter of choice and can depend on performance of the system 1500 implementing the embodiments. As such, the logical operations constituting said example versions of the embodiments are referred to for e.g., as operations, steps or modules.

Similar to a server 1530 described above, a client device 1501 can include a processor, memory, storage device, display, input device and communication interface (e.g., e-mail interface) for connecting the client device to the Internet 1528, the ISP, or LAN 1522, for communication with the servers 1530.

The system 1500 can further include computers (e.g., personal computers, computing nodes) 1505 operating in the same manner as client devices 1501, wherein a user can utilize one or more computers 1505 to manage data in the server 1530.

Figure 16:
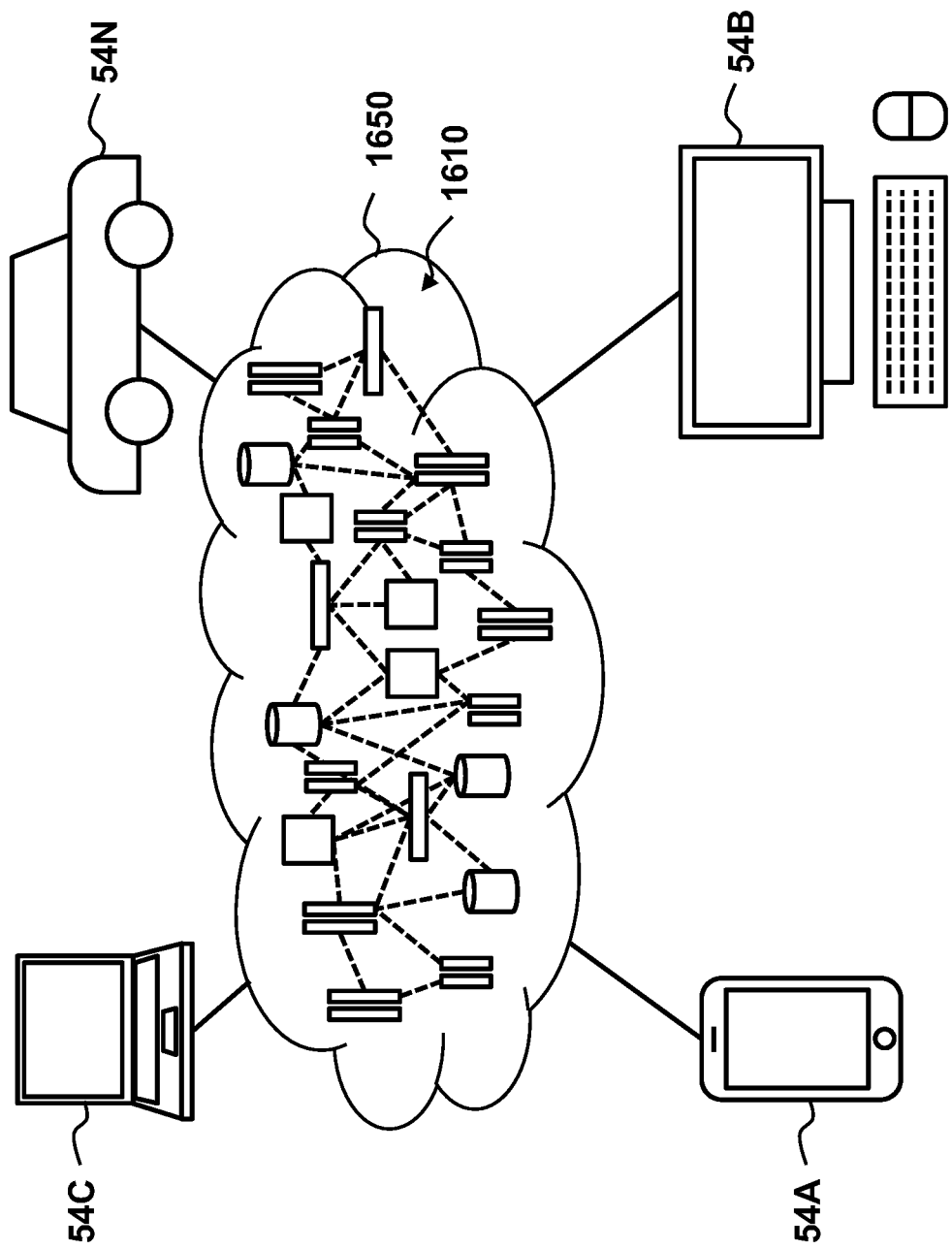
FIG. 16 depicts a cloud computing environment for implementing an embodiment of the system and process disclosed herein.

Referring now to FIG. 16, illustrative cloud computing environment 50 is depicted. As shown, cloud computing environment 50 comprises one or more cloud computing nodes 1610 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 1610 may communicate with one another. They may be grouped (not shown) physically or virtually, in one or more networks, such as Private, Community, Public, or Hybrid clouds as described hereinabove, or a combination thereof. This allows cloud computing environment 1650 to offer infrastructure, platforms and/or software as services for which a cloud consumer does not need to maintain resources on a local computing device. It is understood that the types of computing devices 54A-N shown in FIG. 16 are intended to be illustrative only and that computing nodes 1610 and cloud computing environment 1650 can communicate with any type of computerized device over any type of network and/or network addressable connection (e.g., using a web browser).

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. An aircraft autopilot guidance control system for guiding an aircraft having a body, the system comprising:
   a processor configured to determine if a yaw angle difference and a pitch angle difference meet corresponding angle thresholds;

a skid-to-turn module configured to generate a skid-to-turn signal if the corresponding angle thresholds are met;

a bank-to-turn module configured to generate a bank-to-turn signal having a lower bandwidth than the generated skid-to-turn signal;

a rudder integrator module configured to add a rudder integrator feedback signal to the bank-to-turn signal, wherein the rudder integrator feedback signal is proportional to a rudder integrator; and a filter module configured to filter the generated bank-to-turn signal, wherein the filter module comprises a low-pass filter configured by a set of gains to pass the bank-to-turn signal if a side force on the body meets a side force threshold.

2. The system of claim 1, wherein the processor is further configured to: receive a body to target line of sight signal, receive a line of sight rate signal, and determine the yaw angle difference and the pitch angle difference based on the body to target line of sight signal and the line of sight rate signal.

3. The system of claim 2, wherein:
the skid-to-turn module further comprises a loop for implementing the skid-to-turn signal;
the rudder integrator module further comprises a rudder integrator feedback gain configured to receive an output from the loop for implementing the skid-to-turn signal; and
the bank-to-turn module further comprises a loop for implementing the bank-to-turn signal configured to receive an output from the rudder integrator feedback gain.

4. The system of claim 3, wherein the loop for implementing the skid-to-turn signal further comprises:
a body side specific force command module;
a skid-to-turn steady state gain configured to receive a signal from the body side specific force command module;
a skid-to-turn acceleration error summing junction configured to receive a signal from the skid-to-turn steady state gain;
a skid-to-turn acceleration error gain configured to receive a signal from the skid-to-turn acceleration error summing junction;
a skid-to-turn rate error command summing junction configured to receive a signal from the skid-to-turn acceleration error gain;
a skid-to-turn rate error integrator gain configured to receive a signal from the skid-to-turn rate error command summing junction;
a rudder integrator module configured to receive a signal from the skid-to-turn rate error integrator gain;
a skid-to-turn rate error summing block configured to receive a signal from the rudder integrator module;
a skid-to-turn rudder command control gain configured to receive a signal from the skid-to-turn rate error summing block; and
a skid-to-turn rudder command dynamic pressure scaling gain configured to receive a signal from the skid-to-turn rudder command control gain.

5. The system of claim 4, wherein the rudder integrator feedback gain is configured to receive the signal from the rudder integrator module, and wherein the rudder integrator feedback gain is configured to generate a rudder integrator signal.

6. The system of claim 5, wherein the loop for implementing the bank-to-turn signal further comprises:

a roll angle command module;
an augmented bank-to-turn signal generated based on a signal from the roll angle command module and the generated rudder integrator signal;
a main filter module configured to receive the augmented bank-to-turn signal;
a roll angle error summing junction configured to receive a signal from the main filter module;
a roll angle error proportional gain configured to receive a signal from the roll angle error summing junction;
a roll rate command proportional and integral summing junction configured to receive a signal from the roll angle error proportional gain;
a roll angle error integral gain configured to receive a signal from the roll angle error summing junction;
a roll angle error integrator configured to receive a signal from the roll angle error integral gain;
a roll rate error summing junction configured to receive a signal from the roll angle error integrator, a signal from the roll rate command proportional and integral summing junction, and a signal from a roll rate feedback gain; and
a roll aileron command dynamic pressure scaling gain configured to receive a signal from the roll rate error summing junction.

7. The system of claim 6, wherein the roll angle command module further comprises the low-pass filter.

8. The system of claim 6, wherein the roll angle command module is configured to set to a non-zero value for generating the bank-to-turn signal with a lower bandwidth than the skid-to-turn signal generated by the body side specific force command module.

9. The system of claim 6, wherein the main filter module is configured to decouple the loop for implementing the bank-to-turn signal and the loop for implementing the skid-to-turn signal.

10. The system of claim 6, wherein a low-pass filter of the main filter module is configured to ensure that the bank-to-turn signal has lower bandwidth than the skid-to-turn signal.

11. The system of claim 6, wherein the processor is further configured to:
generate one or more actuator commands; and
output the one or more actuator commands to vehicle plant dynamics.

12. The system of claim 11, wherein the vehicle plant dynamics comprise:
a skid-to-turn rudder actuator transfer function model configured to receive a signal from the skid-to-turn rudder command dynamic pressure scaling gain;
a roll aileron actuator transfer function model configured to receive a signal from the roll aileron command dynamic pressure scaling gain; and
a vehicle lateral dynamics state-space model configured to receive a signal from the skid-to-turn rudder actuator transfer function model and a signal from the roll aileron actuator transfer function model.

13. The system of claim 12, wherein the system further comprises:
one or more optical sensors, wherein the one or more optical sensors are configured to generate the body to target line of sight.

14. The system of claim 13, wherein the system further comprises:
one or more differentiators, wherein the one or more differentiators are configured to generate the line of sight rate.

15. The system of claim 14, wherein the generated line of sight rate comprises differentiation of a line-of-sight vector expressed in an inertial frame.

16. The system of claim 15, wherein the system further comprises:
   one or more side force optimizers, wherein the one or more side force optimizers are configured to provide the side force threshold to the processor.

17. The system of claim 16, wherein the side force threshold is selected through optimization and set prior to a flight.

18. The system of claim 17, wherein the system further comprises:
   one or angle threshold optimizers, wherein the one or angle threshold optimizers are configured to provide the angle thresholds to the processor.

19. The system of claim 17, wherein the angle thresholds are selected through optimization and set prior to the flight.

* * * * *